(12) United States Patent
Taherzadeh Boroujeni et al.

(10) Patent No.: US 12,058,738 B2
(45) Date of Patent: Aug. 6, 2024

(54) FRONT-LOADED TRANSMISSION IN A RANDOM ACCESS CHANNEL PROCEDURE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/204,772

(22) Filed: Mar. 17, 2021

(65) Prior Publication Data

US 2021/0298083 A1 Sep. 23, 2021

Related U.S. Application Data

(60) Provisional application No. 62/992,708, filed on Mar. 20, 2020.

(51) Int. Cl.
*H04W 74/0833* (2024.01)
*H04L 5/00* (2006.01)

(52) U.S. Cl.
CPC ....... *H04W 74/0833* (2013.01); *H04L 5/0048* (2013.01)

(58) Field of Classification Search
CPC ............ H04W 74/0833; H04W 72/046; H04L 5/001; H04L 5/0025; H04L 5/0048
See application file for complete search history.

(56) References Cited

U.S. PATENT DOCUMENTS

| | | | |
|---|---|---|---|
| 2012/0113938 A1* | 5/2012 | Larsson | H04W 74/008 370/329 |
| 2013/0083768 A1* | 4/2013 | Liu | H04L 27/2636 370/330 |
| 2017/0251460 A1* | 8/2017 | Agiwal | H04B 7/0617 |
| 2017/0367120 A1* | 12/2017 | Murray | H04W 74/0833 |
| 2018/0027594 A1 | 1/2018 | Nagaraja et al. | |
| 2018/0098298 A1* | 4/2018 | Jung | H04W 48/08 |

(Continued)

OTHER PUBLICATIONS

U.S. Appl. No. 62/991,102, filed Mar. 18, 2020 (Year: 2020).*

(Continued)

*Primary Examiner* — Ian N Moore
*Assistant Examiner* — Sun Jong Kim
(74) *Attorney, Agent, or Firm* — Holland & Hart LLP

(57) ABSTRACT

Methods, systems, and devices for wireless communications are described. For instance, a user equipment (UE) may transmit a first message of a RACH procedure to a base station. The UE may receive a second message of the RACH procedure from the base station based on the first message. The UE may transmit a preamble, a reference signal, or both and a third message of the RACH procedure to the base station based on the second message. The UE may transmit the preamble, the reference signal, or both before transmission of the third message. In some cases, the UE may receive control signaling that indicates whether to transmit the preamble, the reference signal, both, or neither with the third message. Additionally or alternatively, the control signaling may indicate a resource for the preamble, the reference signal, or both and a resource for the third message.

30 Claims, 17 Drawing Sheets

(56) References Cited

U.S. PATENT DOCUMENTS

| | | | | |
|---|---|---|---|---|
| 2018/0176958 A1* | 6/2018 | Islam | ............... | H04W 72/046 |
| 2019/0075598 A1* | 3/2019 | Li | ............... | H04W 74/0833 |
| 2019/0090218 A1* | 3/2019 | Noh | ............... | H04W 72/23 |
| 2019/0141703 A1* | 5/2019 | Gupta | ............... | H04L 5/0048 |
| 2019/0246290 A1* | 8/2019 | Lee | ............... | H04W 72/23 |
| 2020/0099439 A1* | 3/2020 | Mundarath | ............... | H04B 17/318 |
| 2020/0128589 A1* | 4/2020 | Wu | ............... | H04W 74/006 |
| 2021/0120581 A1* | 4/2021 | Kim | ............... | H04W 72/14 |
| 2021/0243777 A1* | 8/2021 | Tsai | ............... | H04W 74/006 |
| 2021/0289561 A1* | 9/2021 | Liu | ............... | H04W 74/0833 |
| 2021/0297959 A1* | 9/2021 | Zhou | ............... | H04B 7/0602 |
| 2022/0104254 A1* | 3/2022 | Matsumura | ............... | H04W 76/10 |

OTHER PUBLICATIONS

International Search Report and Written Opinion—PCT/US2021/022934—ISA/EPO—Jul. 14, 2021.
Qualcomm Incorporated: "Measurement Reporting and Beam Refinement During Rach", 3GPP Draft, 3GPP TSG-RAN WG2 Meeting #101bis, R2-1805212—Measurement Reporting and Beam Refinement During RACH, 3rd Generation Partnership Project (3GPP), Mobile Competence Centre, 650, Route Des Lucioles, F-06921 Sophia-Antipolis c vol. RAN WG2, No. Sanya, China, Apr. 16, 2018-Apr. 20, 2018, Apr. 14, 2018 (Apr. 14, 2018), XP051428887, pp. 1-6, Retrieved from the Internet: URL:http://www.3gpp.org/ftp/Meetings%5F3GPP%5FSYNC/RAN2/Docs [retrieved on Apr. 14, 2018] the Whole Document.

* cited by examiner

FRONT-LOADED TRANSMISSION IN A RANDOM ACCESS CHANNEL PROCEDURE

CROSS REFERENCE

The present Application for patent claims the benefit of U.S. Provisional Patent Application No. 62/992,708 by TAHERZADEH BOROUJENI et al., entitled "FRONT-LOADED TRANSMISSION IN A RANDOM ACCESS CHANNEL PROCEDURE," filed Mar. 20, 2020, assigned to the assignee hereof, and expressly incorporated by reference herein.

FIELD OF TECHNOLOGY

The following relates generally to wireless communications and more specifically to front-loaded transmission in a random access channel procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a user equipment (UE) may perform a random access channel (RACH) procedure with a base station to gain access to the base station. If the UE is located too far from the base station, the RACH procedure may fail.

SUMMARY

The described techniques relate to improved methods, systems, devices, and apparatuses that support front-loaded transmission in a random access channel procedure. Generally, the described techniques provide for the transmission of a reference signal and/or a preamble in the RACH procedure to enable increased beam gain and/or improved channel estimation. For instance, a user equipment (UE) may transmit a first message of a random access channel (RACH) procedure to a base station. The UE may receive a second message of the RACH procedure from the base station based on the first message. The UE may transmit a preamble, a reference signal, or both and a third message of the RACH procedure to the base station based on the second message.

A method for wireless communications by a UE is described. The method may include transmitting a first message of a RACH procedure, receiving a second message of the RACH procedure based on the first message, and transmitting a preamble, a reference signal, or both, and a third message of the RACH procedure based on the second message.

An apparatus for wireless communications by a UE is described. The apparatus may include a processor, memory in electronic communication with the processor, and instructions stored in the memory. The instructions may be executable by the processor to cause the apparatus to transmit a first message of a RACH procedure, receive a second message of the RACH procedure based on the first message, and transmit a preamble, a reference signal, or both, and a third message of the RACH procedure based on the second message.

Another apparatus for wireless communications by a UE is described. The apparatus may include means for transmitting a first message of a RACH procedure, means for receiving a second message of the RACH procedure based on the first message, and means for transmitting a preamble, a reference signal, or both, and a third message of the RACH procedure based on the second message.

A non-transitory computer-readable medium storing code for wireless communications by a UE is described. The code may include instructions executable by a processor to transmit a first message of a RACH procedure, receive a second message of the RACH procedure based on the first message, and transmit a preamble, a reference signal, or both, and a third message of the RACH procedure based on the second message.

In some examples of the method, apparatuses, and non-transitory computer-readable medium described herein, transmitting the preamble, the reference signal, or both, may include operations, features, means, or instructions for transmitting the preamble, the reference signal, or both, before transmission of the third message.

In some examples of the method, apparatuses, and non-transitory computer-readable medium described herein, transmitting the preamble, the reference signal, or both, may include operations, features, means, or instructions for transmitting the preamble, the reference signal, or both, based on a reference signal received power measurement.

Some examples of the method, apparatuses, and non-transitory computer-readable medium described herein may further include operations, features, means, or instructions for receiving control signaling configuring the UE to transmit the preamble, the reference signal, or both.

Some examples of the method, apparatuses, and non-transitory computer-readable medium described herein may further include operations, features, means, or instructions for receiving control signaling configuring the UE with a first option for transmission of the preamble, the reference signal, or both, with the third message, and a second option for transmission of the third message without transmission of the preamble, the reference signal, or both.

In some examples of the method, apparatuses, and non-transitory computer-readable medium described herein, receiving the second message may include operations, features, means, or instructions for receiving the second message that indicates the first option to instruct the UE to transmit the preamble, the reference signal, or both, with the third message.

In some examples of the method, apparatuses, and non-transitory computer-readable medium described herein, receiving the second message may include operations, features, means, or instructions for receiving the second message that instructs the UE to transmit the preamble, the reference signal, or both, with the third message.

Some examples of the method, apparatuses, and non-transitory computer-readable medium described herein may further include operations, features, means, or instructions for receiving control signaling configuring the UE with a first resource in which to transmit the preamble, the reference signal, or both, and a second resource in which to transmit the third message.

In some examples of the method, apparatuses, and non-transitory computer-readable medium described herein, the first resource and the second resource may be contiguous in time.

In some examples of the method, apparatuses, and non-transitory computer-readable medium described herein, a time period occurs between the first resource and the second resource.

In some examples of the method, apparatuses, and non-transitory computer-readable medium described herein, the first resource and the second resource may be contiguous in frequency.

In some examples of the method, apparatuses, and non-transitory computer-readable medium described herein, a frequency gap occurs between the first resource and the second resource.

In some examples of the method, apparatuses, and non-transitory computer-readable medium described herein, transmitting the preamble, the reference signal, or both, may include operations, features, means, or instructions for transmitting the preamble, the reference signal, or both, based on an exposure condition being identified.

Some examples of the method, apparatuses, and non-transitory computer-readable medium described herein may further include operations, features, means, or instructions for receiving a fourth message of the RACH procedure based on the third message.

In some examples of the method, apparatuses, and non-transitory computer-readable medium described herein, the RACH procedure may be a four step RACH procedure.

A method for wireless communications by a base station is described. The method may include receiving, from a UE, a first message of a RACH procedure, transmitting a second message of the RACH procedure based on the first message, and receiving a preamble, a reference signal, or both, and a third message of the RACH procedure based on the second message.

An apparatus for wireless communications by a base station is described. The apparatus may include a processor, memory in electronic communication with the processor, and instructions stored in the memory. The instructions may be executable by the processor to cause the apparatus to receive, from a UE, a first message of a RACH procedure, transmit a second message of the RACH procedure based on the first message, and receive a preamble, a reference signal, or both, and a third message of the RACH procedure based on the second message.

Another apparatus for wireless communications by a base station is described. The apparatus may include means for receiving, from a UE, a first message of a RACH procedure, means for transmitting a second message of the RACH procedure based on the first message, and means for receiving a preamble, a reference signal, or both, and a third message of the RACH procedure based on the second message.

A non-transitory computer-readable medium storing code for wireless communications by a base station is described. The code may include instructions executable by a processor to receive, from a UE, a first message of a RACH procedure, transmit a second message of the RACH procedure based on the first message, and receive a preamble, a reference signal, or both, and a third message of the RACH procedure based on the second message.

In some examples of the method, apparatuses, and non-transitory computer-readable medium described herein, receiving the preamble, the reference signal, or both, may include operations, features, means, or instructions for receiving the preamble, the reference signal, or both, before the third message.

In some examples of the method, apparatuses, and non-transitory computer-readable medium described herein, receiving the preamble, the reference signal, or both, may include operations, features, means, or instructions for receiving the preamble, the reference signal, or both, based on a reference signal received power measurement.

Some examples of the method, apparatuses, and non-transitory computer-readable medium described herein may further include operations, features, means, or instructions for transmitting control signaling configuring the UE to transmit the preamble, the reference signal, or both.

Some examples of the method, apparatuses, and non-transitory computer-readable medium described herein may further include operations, features, means, or instructions for transmitting control signaling configuring the UE with a first option for transmission of the preamble, the reference signal, or both, with the third message, and a second option for transmission of the third message without transmission of the preamble, the reference signal, or both.

In some examples of the method, apparatuses, and non-transitory computer-readable medium described herein, transmitting the second message may include operations, features, means, or instructions for transmitting the second message that indicates the first option to instruct the UE to transmit the preamble, the reference signal, or both, with the third message.

In some examples of the method, apparatuses, and non-transitory computer-readable medium described herein, transmitting the second message may include operations, features, means, or instructions for transmitting the second message that instructs the UE to transmit the preamble, the reference signal, or both, with the third message.

Some examples of the method, apparatuses, and non-transitory computer-readable medium described herein may further include operations, features, means, or instructions for transmitting control signaling configuring the UE with a first resource in which to transmit the preamble, the reference signal, or both, and a second resource in which to transmit the third message.

In some examples of the method, apparatuses, and non-transitory computer-readable medium described herein, the first resource and the second resource may be contiguous in time.

In some examples of the method, apparatuses, and non-transitory computer-readable medium described herein, a time period occurs between the first resource and the second resource.

In some examples of the method, apparatuses, and non-transitory computer-readable medium described herein, the first resource and the second resource may be contiguous in frequency.

In some examples of the method, apparatuses, and non-transitory computer-readable medium described herein, a frequency gap occurs between the first resource and the second resource.

In some examples of the method, apparatuses, and non-transitory computer-readable medium described herein, receiving the preamble, the reference signal, or both, may include operations, features, means, or instructions for receiving the preamble, the reference signal, or both, based on an exposure condition being identified.

Some examples of the method, apparatuses, and non-transitory computer-readable medium described herein may further include operations, features, means, or instructions for transmitting a fourth message of the RACH procedure based on the third message.

In some examples of the method, apparatuses, and non-transitory computer-readable medium described herein, the RACH procedure may be a four step RACH procedure.

DETAILED DESCRIPTION

In some cases, a user equipment (UE) and a base station may perform a random access channel (RACH) procedure, which may enable the UE to gain access to the base station for performing communications. Initially, the UE may transmit a first message (e.g., a RACH preamble) to the base station. The base station, after receiving the first message, may transmit a second message (e.g., a random access response (RAR)) to the UE. The UE, after receiving the second message, may transmit a third message (e.g., a physical uplink shared channel (PUSCH) transmission that includes a radio resource control (RRC) connection request). The base station, after receiving the third message, may transmit a fourth message (e.g., a physical downlink shared channel (PDSCH) transmission that includes a contention resolution) to the UE.

In some cases, the UE may have a limited ability to transmit the third message with enough transmit power to be received by the base station. For instance, the UE may have a limited maximum transmit power relative to the base station. As such, there may be scenarios where the UE may receive transmissions from the base station, but the base station may not be able to receive transmissions from the UE. Alternatively, the UE may transmit at a power lower than its maximum transmission power due to one or more constraints. For instance, the UE may operate according to maximum permissible exposure (MPE) limits.

Methods which improve channel estimation capabilities by the base station and/or increases receive beam gain at the base station may increase the coverage of the UE (e.g., without increasing the transmit power of the third message). To enable the base station to have improved channel estimation and/or increased beam gain, the UE may transmit a preamble, a reference signal, or both with the third message. The base station may use the preamble, the reference signal, or both to perform channel estimation, to refine a receive beam of the base station, or both, which may enable the base station to have a greater coverage over which the base station may receive the third message.

Aspects of the disclosure are initially described in the context of wireless communications systems. Additional aspects of the disclosure are described in the context of an additional wireless communications system, a RACH procedure, and a process flow. Aspects of the disclosure are further illustrated by and described with reference to apparatus diagrams, system diagrams, and flowcharts that relate to front-loaded transmission in a random access channel procedure.

Figure 1:
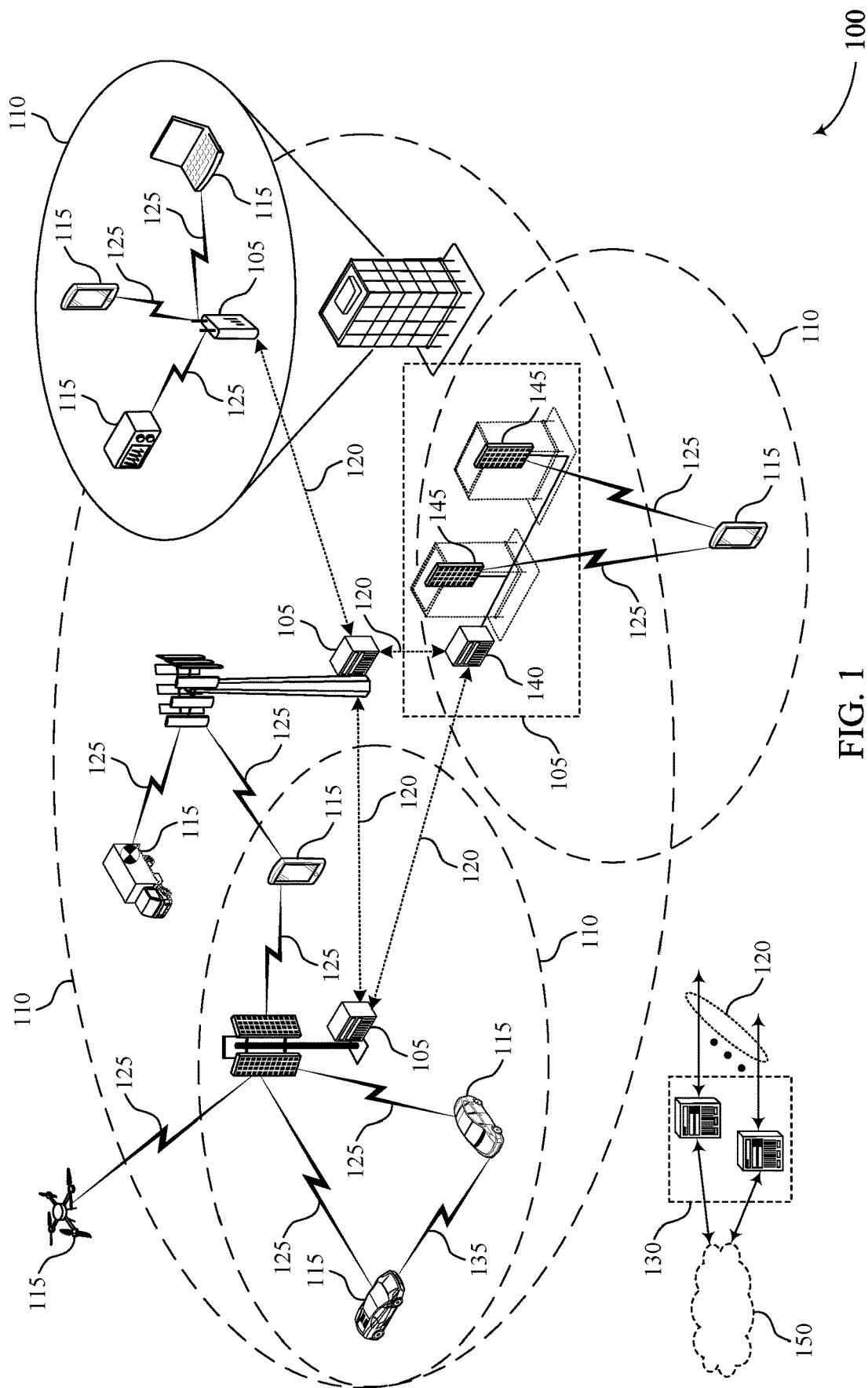
FIG. 1 illustrates an example of a wireless communications system in accordance with aspects of the present disclosure.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz. (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHZ.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Generally, the techniques as described herein may provide for the transmission of a reference signal and/or a preamble in the RACH procedure to enable increased beam gain and/or improved channel estimation. For instance, a UE 115 may transmit a first message of a RACH procedure to a base station 105. The UE 115 may receive a second message of the RACH procedure from the base station 105 based on the first message. The UE 115 may transmit a preamble, a reference signal, or both and a third message of the RACH procedure to the base station 105 based on the second message.

Figure 2:
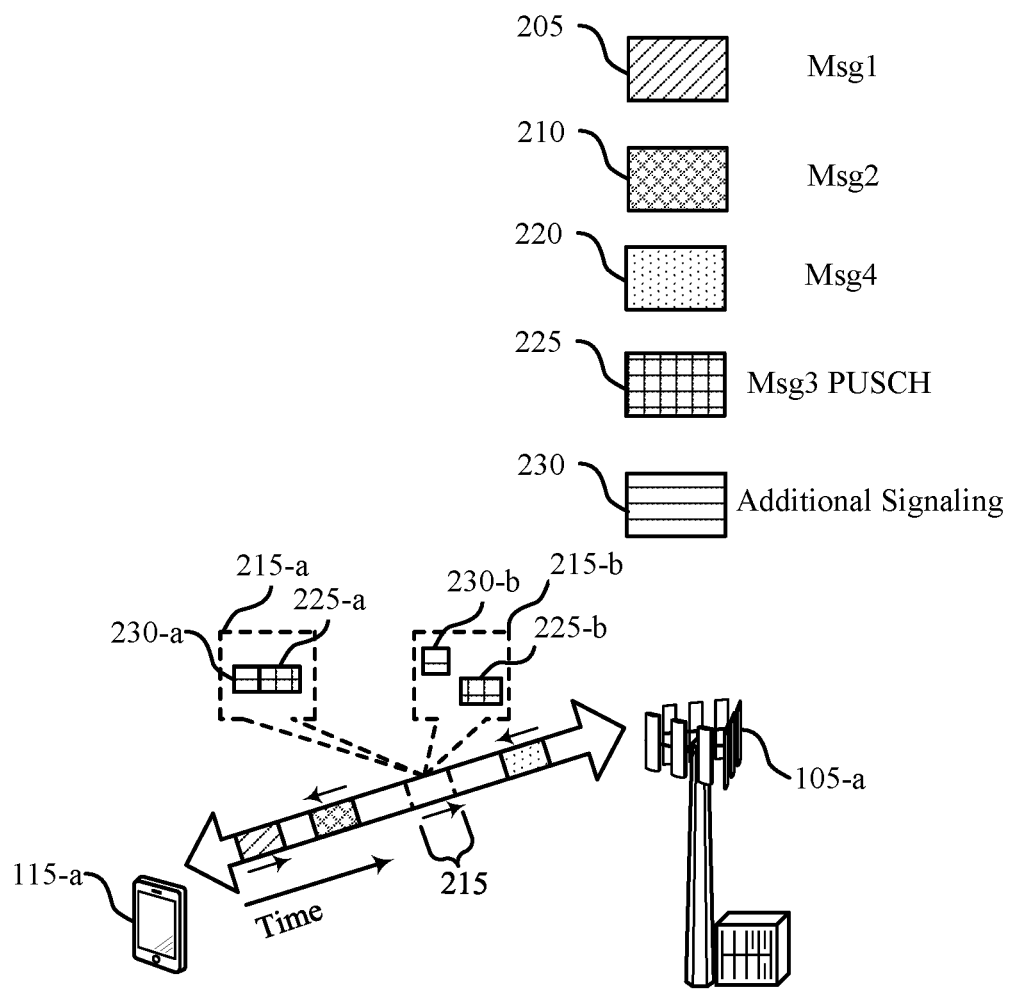
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. For instance, UE 115-*a* may be an example of a UE 115 as described with reference to FIG. 1 and base station 105-*a* may be an example of a base station 105 as described with reference to FIG. 1.

In some cases, UE 115-*a* and base station 105-*a* may perform a RACH procedure. Initially, UE 115-*a* may transmit a first message 205 (i.e., Msg1) to base station 105-*a*. Base station 105-*a*, after receiving the first message 205, may transmit a second message 210 (i.e., Msg2) to UE 115-*a*. UE 115-*a*, after receiving the second message 210, may transmit a third message 215 (i.e., Msg3). Base station 105-*a*, after receiving the third message 215, may transmit a fourth message 220 (i.e., Msg4) to UE 115-*a*.

Performing a RACH procedure may limit (e.g., be a bottleneck for) the coverage of millimeter-wave (mmW) 5G devices, of which UE 115-*a* and base station 105-*a* may be examples. The coverage may be limited or impacted due to one or both of the devices using wide broadcast synchronization signal block (SSB) beams for the RACH procedure. For instance, beams which are wider may have a lower beam gain, which may limit coverage. Additionally, the coverage may be impacted due to UE 115-*a* having a limited transmit power by which UE 115-*a* may transmit the third message 215 (e.g., a transmit power that is significantly less than that of the transmit power of base station 105-*a*). Another factor may be that UE 115-*a* may not be able to transmit at maximum power due to one or more constraints. For instance, body contact may involve UE 115-*a* transmitting at a lower power due to MPE constraints. As such, when transmission power is constrained, the quality of channel estimation may be a factor in performance for establishing connectivity between the UE 115-*a* and/or base station 105-*a*. The methods as described herein may increase the beam gain of a receive beam of base station 105-*a* and/or may improve channel estimation capabilities of base station 105-*a*.

For instance, such methods may involve UE 115-*a* transmitting an alternative type of the Msg3 in the four-step RACH procedure (e.g., the third message 215) which may be referred to as a front-loaded Msg3. The front loaded Msg3 may in include additional signaling 230 (e.g., a preamble and/or reference signal) with or before the Msg3 PUSCH 225. The additional signaling 230 (e.g., the preamble and/or reference signal) before the Msg3 PUSCH 225 may be used by base station 105-*a* to refine the receive beam at base station 105-*a* for reception of the Msg3 PUSCH 225 and/or to improve channel estimation for the Msg3 PUSCH 225. In some cases, UE 115-*a* may select the front loaded Msg3 (e.g., which includes the preamble and/or front-loaded reference signal) depending on its SSB measurements (e.g., SSB-based reference signal received power (RSRP)) and/or its exposure condition (e.g., its MPE condition). For instance, if UE 115-*a* determines that the RSRP value or other SSB measurements satisfies a threshold (e.g., is above a threshold), UE 115-*a* may transmit a Msg3 that does not include additional signaling 230. However, if UE 115-*a* determines that the RSRP value or other SSB measurements do not satisfy the threshold (e.g., is below the threshold), UE 115-*a* may transmit the front loaded Msg3. Additionally or alternatively, if UE 115-*a* determines that the MPE value satisfies a threshold (e.g., is above a threshold), UE 115-*a* may transmit a Msg3 that does not include additional signaling 230. However, if UE 115-*a* determines that the MPE value does not satisfy the threshold (e.g., is above the threshold), UE 115-*a* may transmit a front loaded Msg3.

In some cases, the usage of the front loaded Msg3 (e.g., Msg3) may be linked to the usage of an alternative type of the first message 205 (e.g., Msg1). UE 115-*a* may transmit Msg1 in one of a variety of formats. For instance, if transmitting Msg3 without additional signaling 230, the format in which UE 115-*a* may send Msg1 may be a first format used in conventional 4-step RACH. Alternatively, if transmitting a front loaded Msg3, the format may be a second format that includes an additional field or a field of the Msg1 configured in such a way as to indicate to base station 105-*a* that UE 115-*a* may transmit a front loaded Msg3.

Additionally or alternatively, base station 105-*a* may select the front loaded Msg3 and may signal, via the second message 210 (e.g., Msg2), to UE 115-*a* to transmit the front loaded Msg3. For instance, the Msg2 may instruct UE 115-*a* to transmit additional signaling 230 (e.g., the preamble, the reference signal, or both) with the Msg3. If the third message 215 includes the preamble, the third message 215 may be referred to as a preamble front loaded Msg3.

In some examples, time and frequency resources in which the alternative type of the third message 215 (e.g., Msg3) is communicated may be contiguous. For instance, for third message 215-*a*, additional signaling 230-*a* and Msg3 PUSCH 225-*a* may be contiguous in time and frequency resources. For instance, the first resource may span a first transmission time interval (TTI) (e.g., symbol period, slot, subframe) that is consecutive in time with a second TTI which the second resource spans. Additionally or alternatively, the first resource may span a first range of frequencies (e.g., a one or more subcarriers, one or more BWPs, one or more sub-bands, one or more resource blocks (RB)) that is consecutive in frequency with a second range of frequencies which the second resource spans.

Alternatively or additionally, the resources may be discontinuous in at least one of time and frequency. For instance, there may be a time gap and/or frequency gap between the additional signaling 230 (e.g., the preamble and/or reference signal) and the transmission of the msg3 PUSCH 225. In cases where the time gap is present, there may be at least one intervening TTI (e.g., symbol period, slot, subframe) between the first resource and the second resource. In cases where the frequency gap is present, there may be a span of frequencies (e.g., at least one subcarrier, BWP, sub-band, or RB) between the first resource and the second resource. In some cases, the frequency resources for the preamble and the reference signal may be discontinuous. One example of discontinuous resources may be third message 215-*b*. In third message 215-*b*, additional signaling 230-*b* and Msg3 PUSCH 225-*b* may be discontinuous in time and frequency.

In some examples, the methods as described herein may be associated with one or more advantages. For instance, by transmitting the additional signaling 230 (e.g., the preamble and/or reference signal) with or before the Msg3 PUSCH 225, the base station 105-*a* may be able to refine the receive beam for reception of the Msg3 PUSCH 225. Additionally or alternatively, the base station 105-*a* may be able to perform improved channel estimation for the Msg3 PUSCH 225. Refining the receive beam and/or performing improved (e.g., more accurate) channel estimation may enable the UE 115-*a* and the base station 105-*a* to perform more efficient communications. For instance, the base station 105-*a* may be able to more often receive and/or correctly decode Msg3 PUSCH 225 by refining the receive beam and/or performing channel estimation according to the methods described herein.

Figure 3:
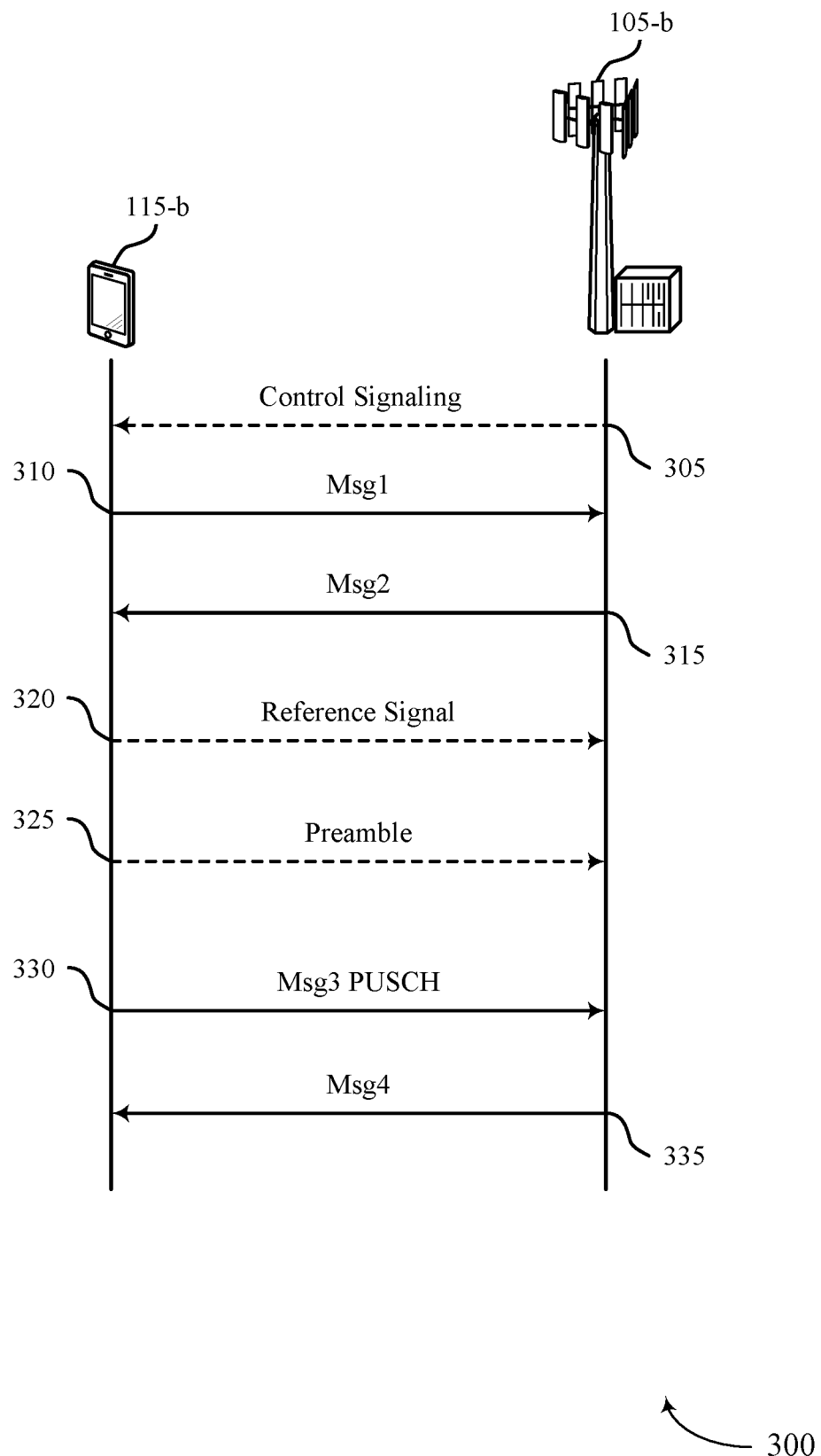
FIG. 3 illustrates an example of a random access channel (RACH) procedure in accordance with aspects of the present disclosure.

FIG. 3 illustrates an example of a RACH procedure 300 in accordance with aspects of the present disclosure. In some examples, RACH procedure 300 may implement aspects of wireless communications system 100. For instance, UE 115-*b* may be an example of a UE 115 as described with reference to FIG. 1 and base station 105-*b* may be an example of a base station 105 as described with reference to FIG. 1.

At 305, base station 105-*b* may transmit control signaling to UE 115-*b*. The control signaling may configure UE 115-*b* to transmit a preamble (e.g., at 320), a reference signal (e.g., at 325), or both. Additionally or alternatively, the control signaling, which may include remaining minimum system information (RMSI) may configure UE 115-*b* with a first option for transmission of the preamble, the reference signal, or both, with a Msg3 PUSCH transmission (e.g., at 330) and a second option for transmission of the Msg3 PUSCH without the reference signal, the preamble, or both. Additionally or alternatively, the control signaling may configure UE 115-*b* with a first resource in which to transmit the preamble, the reference signal, or both and a second resource in which to transmit the Msg3 PUSCH transmission. The first and second resources may be contiguous in time or a time period may occur between the first resource and the second resource. Additionally or alternatively, the first and second resources may be contiguous in frequency or a frequency gap may occur between the first resource and the second resource.

At 310, UE 115-*b* may transmit Msg1 to base station 105-*b*. At 315, base station 105-*b* may transmit Msg2 to UE 115-*b*. In some cases, Msg2 may include an index that may indicate whether UE 115-*b* is to transmit a reference signal (e.g., at 320) and/or a preamble (e.g., at 325) with a Msg3 PUSCH transmission (e.g., transmitted at 330).

At 320, UE 115-*b* may transmit a reference signal to base station 105-*b*. UE 115-*b* may determine to transmit the reference signal based on a RSRP or an exposure condition (e.g., an MPE). At 325, UE 115-*b* may transmit a preamble to base station 105-*b*. UE 115-*b* may determine to transmit the preamble based on an RSRP or an exposure condition (e.g., an MPE condition is identified)

At 330, UE 115-*b* may transmit a Msg3 PUSCH transmission to base station 105-*b*. At 335, base station 105-*b* may transmit Msg4 to UE 115-*b*. After UE 115-*b* receives Msg4, UE 115-*b* and base station 105-*b* may have successfully established a connection and may communicate using the established connection. As such, UE 115-*b* and base station 105-*b* may have successfully completed the RACH procedure.

Figure 4:
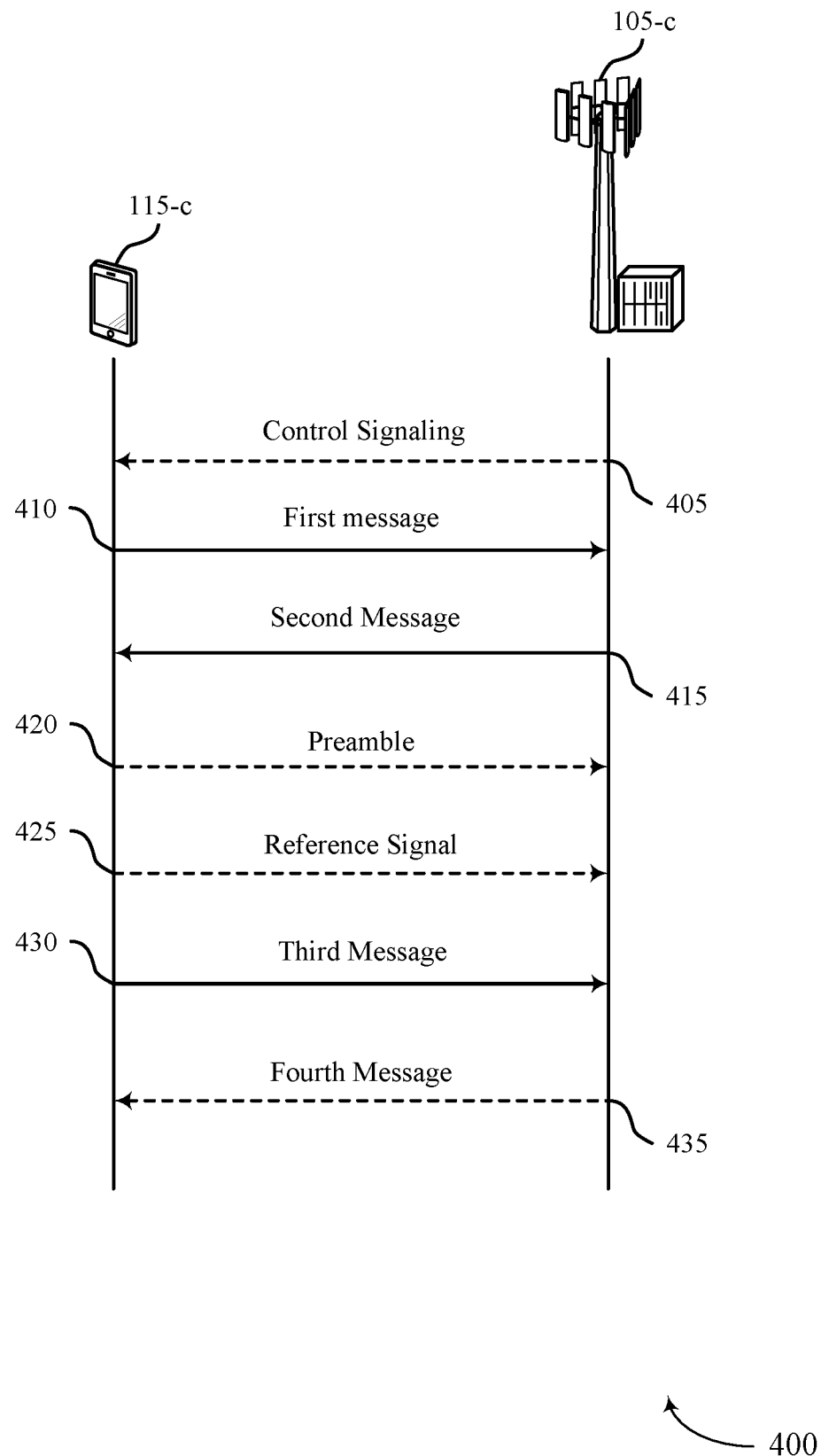
FIG. 4 illustrates an example of a process flow in accordance with aspects of the present disclosure.

FIG. 4 illustrates an example of a process flow 400 in accordance with aspects of the present disclosure. In some examples, process flow 400 may implement aspects of wireless communications system 100. For instance, UE 115-*c* may be an example of a UE 115 as described with reference to FIG. 1. and base station 105-*c* may be an example of a base station 105 as described with reference to FIG. 1.

At 405, UE 115-*c* may transmit control signaling. Base station 105-*c* may receive the control signaling. The control signaling may configure UE 115-*c* to transmit a preamble (e.g., at 420), a reference signal (e.g., at 425), or both. Additionally or alternatively, the control signaling may configure UE 115-*c* with a first option for transmission of the preamble, the reference signal, or both, with a third message (e.g., transmitted at 430), and a second option for transmission of the third message without transmission of the preamble, the reference signal, or both. In some cases, the control signaling may configure UE 115-*c* with a first resource in which to transmit the preamble, the reference signal, or both, and a second resource in which to transmit the third message. The first and second resource may be contiguous in time or a time period may occur between the first resource and the second resource. Additionally or alternatively, the first resource and the second resource may be contiguous in frequency or a frequency gap may occur between the first resource and the second resource.

At 410, UE 115-*c* may transmit a first message of a RACH procedure (e.g., Msg1). Base station 105-*c* may receive the first message. In some cases, the RACH procedure may be a four-step RACH procedure.

At 415, base station 105-*c* may transmit a second message of the RACH procedure (e.g., Msg2) based on receiving the first message. UE 115-*c* may receive the second message. In cases where the control signaling indicates the first and second options, the second message may indicate the first option to instruct UE 115-*c* to transmit a preamble, a reference signal, or both with a third message. Additionally or alternatively, the second message may instruct UE 115-*c* to transmit the preamble, the reference signal, or both, with the third message.

At 420, UE 115-*c* may transmit a preamble based on receiving the second message. Base station 105-*c* may receive the preamble. In some cases, UE 115-*c* may transmit the preamble based on identifying an exposure condition.

At 425, UE 115-*c* may transmit a reference signal based on receiving the second message. Base station 105-*c* may receive the reference signal. In some cases, UE 115-*c* may transmit the reference signal based on identifying an exposure condition.

At 430, UE 115-*c* may transmit a third message of the RACH procedure (e.g., Msg3) based on receiving the second message. Base station 105-*c* may receive the third message. In some cases, UE 115-*c* may transmit the preamble (e.g., at 420), the reference signal (e.g., at 425), or both before transmission of the third message. In some cases, UE 115-*c* may transmit the preamble, the reference signal, or both based on an RSRP measurement.

At 435, base station 105-*c* may transmit a fourth message of the RACH procedure (e.g., Msg4) based on receiving the fourth message. UE 115-*c* may receive the fourth message.

Figure 5:
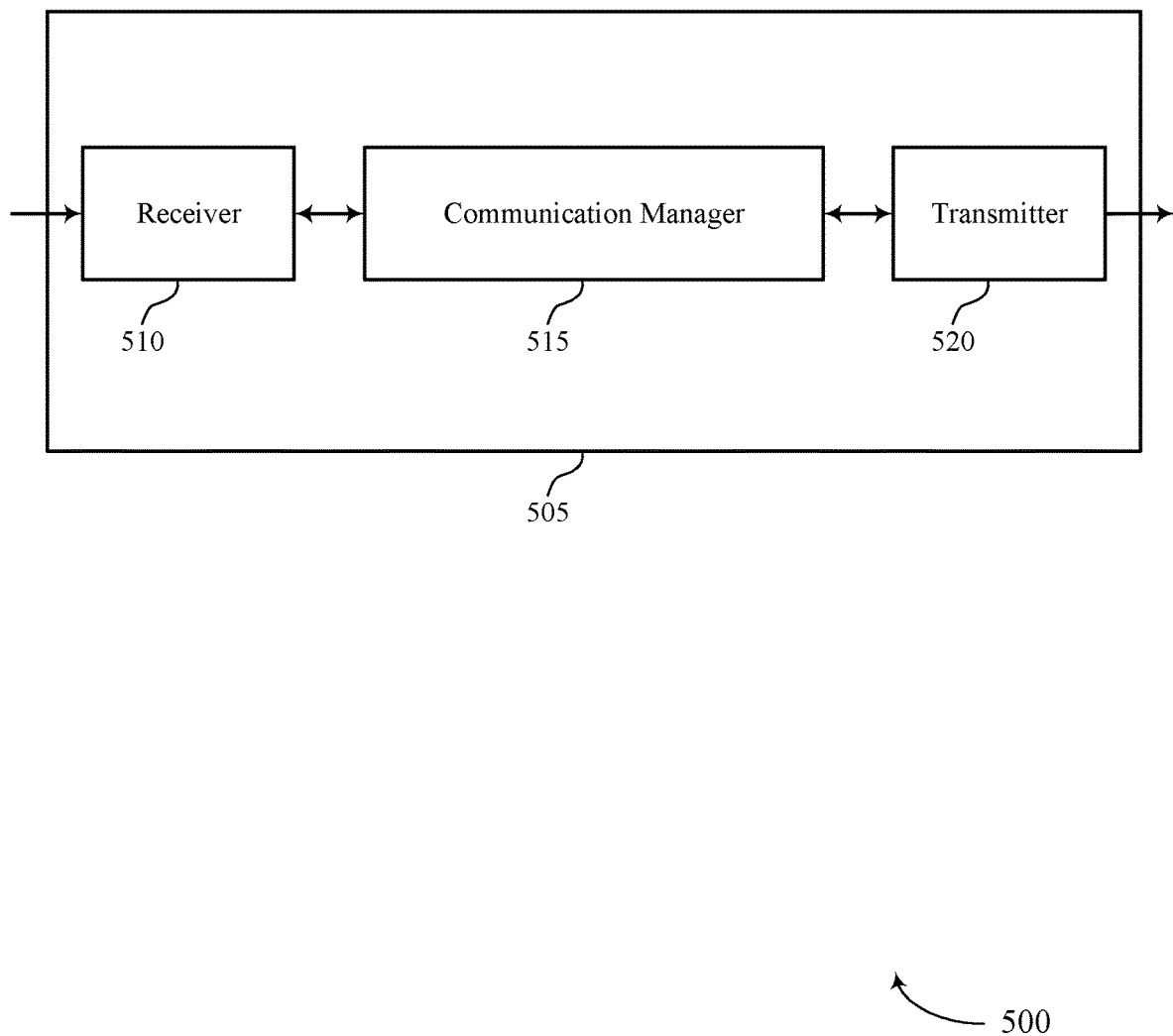
FIGS. 5 and 6 show block diagrams of devices that support front-loaded transmission in a random access channel procedure in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to front-loaded transmission in a random access channel procedure, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may transmit a first message of a RACH procedure, receive a second message of the RACH procedure based on the first message, and transmit a preamble, a reference signal, or both, and a third message of the RACH procedure based on the second message. The communication manager 515 may be an example of aspects of the communication manager 810 described herein.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

By including or configuring the communication manager 515 in accordance with examples as described herein, the device 505 (e.g., a processor controlling or otherwise coupled to the receiver 510, the transmitter 520, the communication manager 515, or a combination thereof) may support techniques for a device communicating with device 505 to refine a receive beam for receiving the third message based on the received reference signal, the received preamble, or both. Additionally or alternatively, the device 505 may support techniques for a device communicating with device 505 to perform improved (e.g., more accurate) channel estimation for reception of the third message. Accordingly, the device 505 and a device with which the device 505 communicates may perform more efficient communications.

Figure 6:
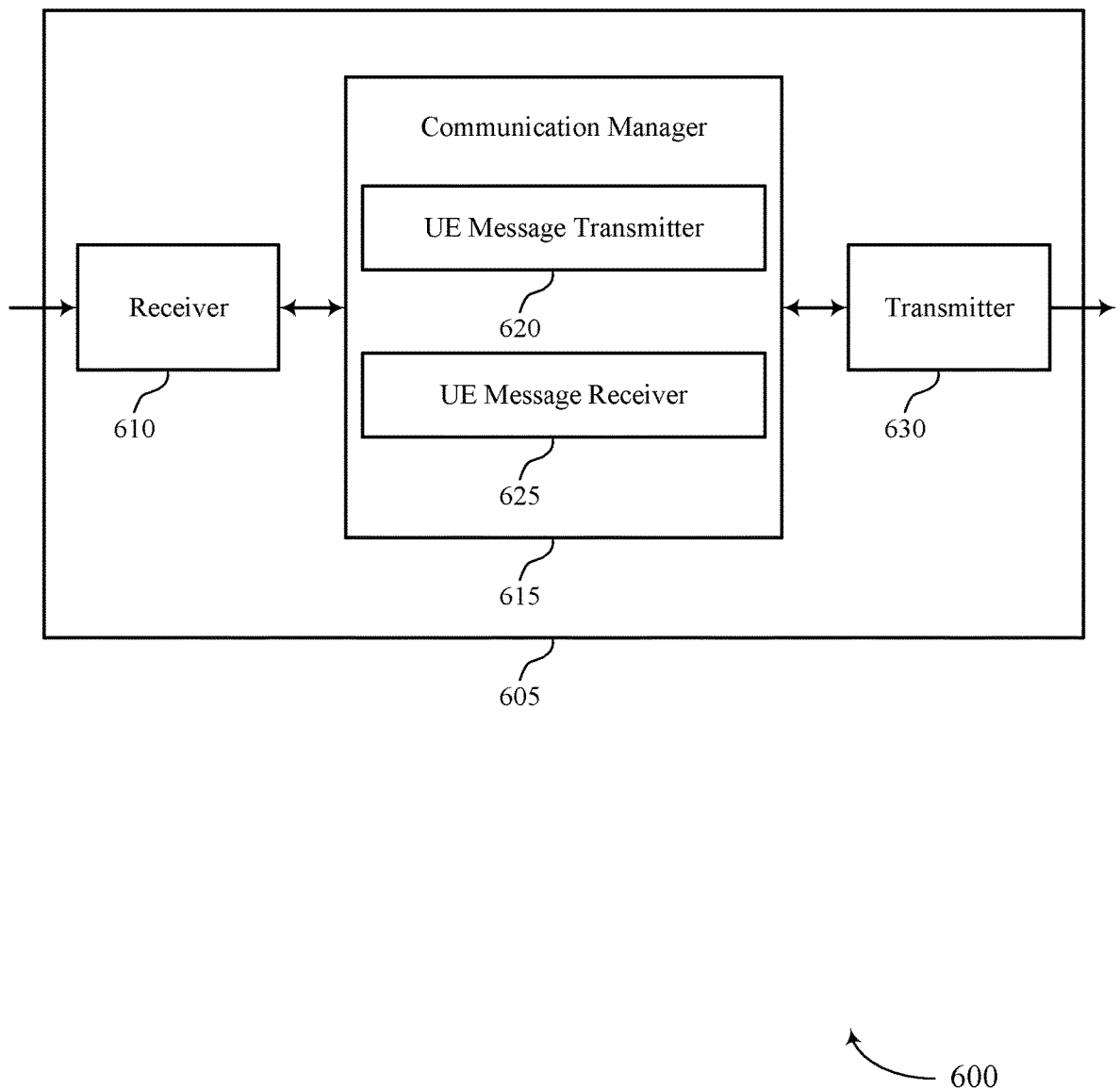

FIG. 6 shows a block diagram 600 of a device 605 in accordance with aspects of the present disclosure. The device 605 may be an example of aspects of a device 505, or a UE 115 as described herein. The device 605 may include a receiver 610, a communication manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to front-loaded transmission in a random access channel procedure, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include an UE message transmitter 620 and an UE message receiver 625. The communication manager 615 may be an example of aspects of the communication manager 810 described herein.

The UE message transmitter 620 may transmit a first message of a RACH procedure. In some cases, the UE message transmitter 620 may transmit a preamble, a reference signal, or both, and a third message of the RACH procedure based on a second message received by UE message receiver 625. The UE message receiver 625 may receive a second message of the RACH procedure based on the first message.

The transmitter 630 may transmit signals generated by other components of the device 605. In some examples, the transmitter 630 may be collocated with a receiver 610 in a transceiver module. For example, the transmitter 630 may be an example of aspects of the transceiver 815 described with reference to FIG. 8. The transmitter 630 may utilize a single antenna or a set of antennas.

Figure 7:
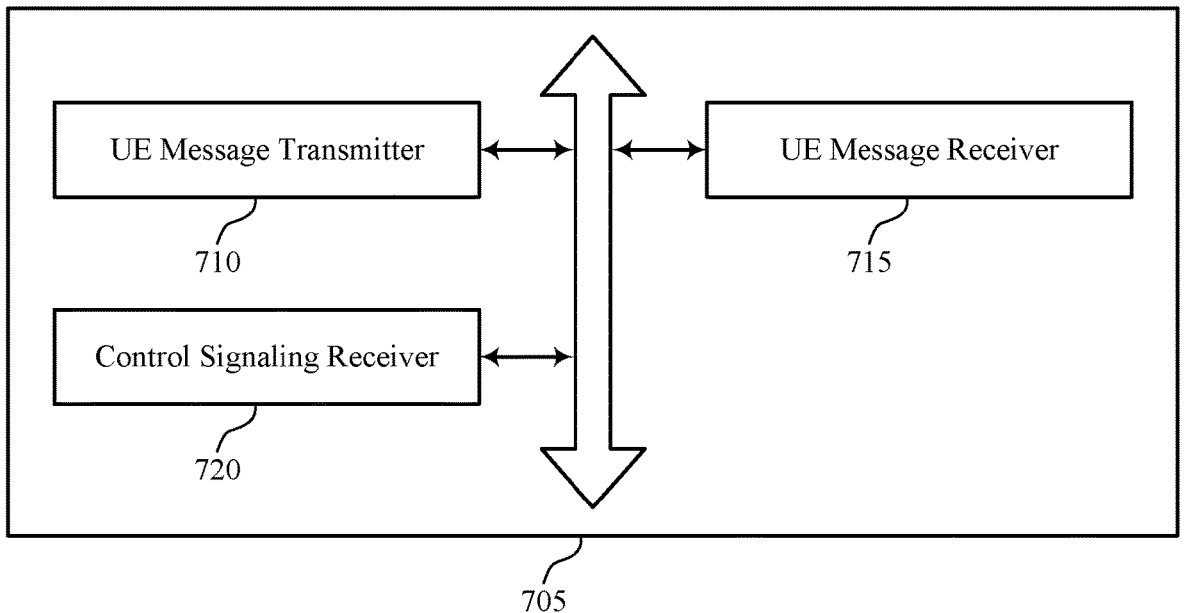
FIG. 7 shows a block diagram of a communication manager in accordance with aspects of the present disclosure.

FIG. 7 shows a block diagram 700 of a communication manager 705 in accordance with aspects of the present disclosure. The communication manager 705 may be an example of aspects of a communication manager 515, a communication manager 615, or a communication manager 810 described herein. The communication manager 705 may include an UE message transmitter 710, an UE message receiver 715, and a control signaling receiver 720. Each of these modules may communicate, directly or indirectly, with one another (e.g., via one or more buses).

The UE message transmitter 710 may transmit a first message of a RACH procedure. In some examples, the UE message transmitter 710 may transmit a preamble, a reference signal, or both, and a third message of the RACH procedure based on a second message received by UE message receiver 715. In some examples, the UE message transmitter 710 may transmit the preamble, the reference signal, or both, before transmission of the third message. In some examples, the UE message transmitter 710 may transmit the preamble, the reference signal, or both, based on a reference signal received power measurement. In some examples, the UE message transmitter 710 may transmit the preamble, the reference signal, or both, based on an exposure condition being identified. In some examples, the RACH procedure may be a four step RACH procedure.

The UE message receiver 715 may receive a second message of the RACH procedure based on the first message. In some examples, the second message may indicate the first option to instruct the UE to transmit the preamble, the reference signal, or both, with the third message. In some examples, the second message may instruct the UE to transmit the preamble, the reference signal, or both, with the third message. In some examples, the UE message receiver 715 may receive a fourth message of the RACH procedure based on the third message.

The control signaling receiver 720 may receive control signaling configuring the UE to transmit the preamble, the reference signal, or both. In some examples, the control signaling receiver 720 may receive control signaling configuring the UE with a first option for transmission of the preamble, the reference signal, or both, with the third message, and a second option for transmission of the third message without transmission of the preamble, the reference signal, or both. In some examples, the control signaling receiver 720 may receive control signaling configuring the UE with a first resource in which to transmit the preamble, the reference signal, or both, and a second resource in which to transmit the third message. In some examples, the first resource and the second resource may be contiguous in time. In some examples, the time period occurs between the first resource and the second resource. In some examples, the first resource and the second resource are contiguous in frequency. In some examples, the frequency gap occurs between the first resource and the second resource.

Figure 8:
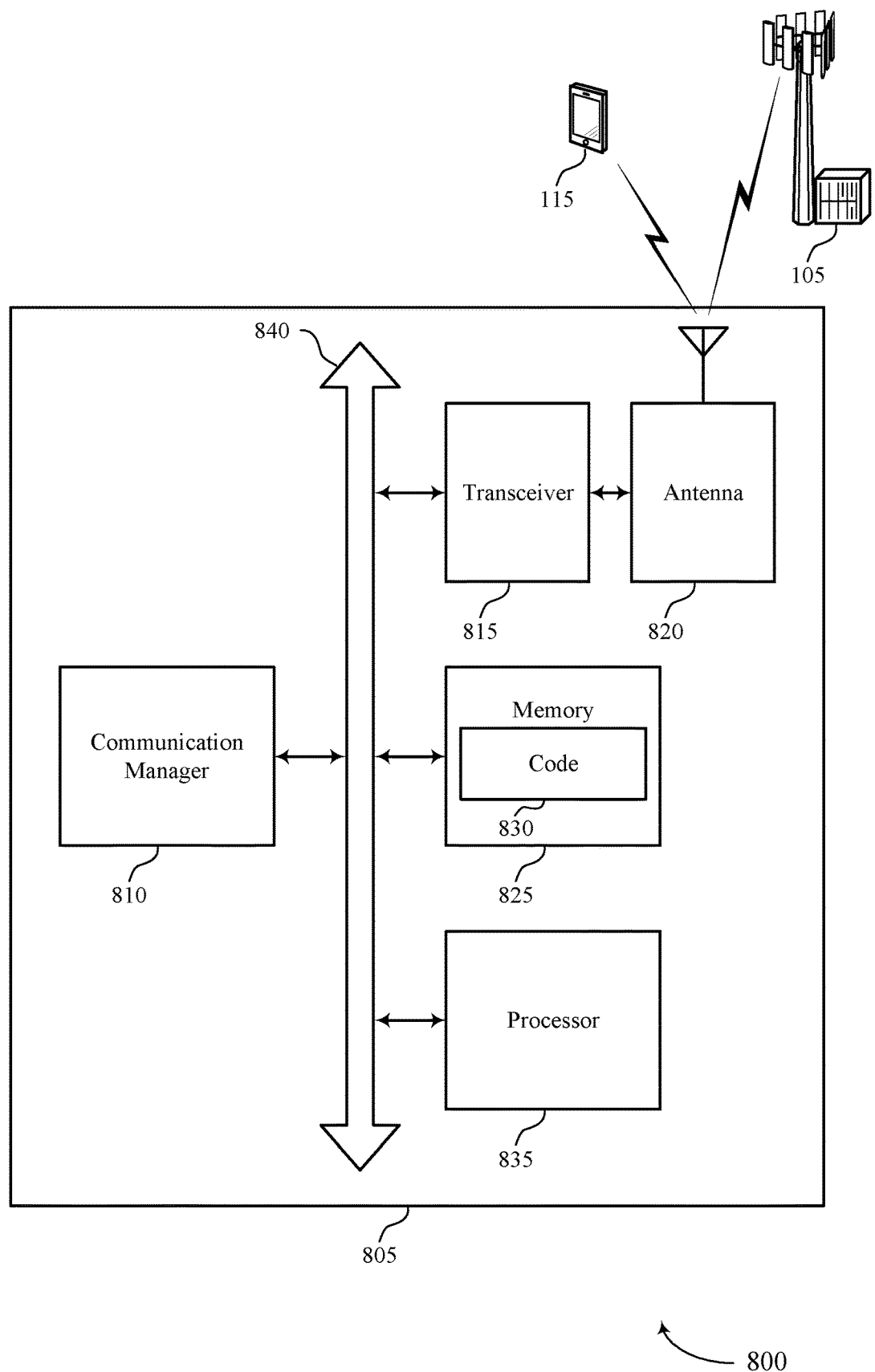
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may transmit a first message of a RACH procedure, receive a second message of the RACH procedure based on the first message, and transmit a preamble, a reference signal, or both, and a third message of the RACH procedure based on the second message.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting front-loaded transmission in a random access channel procedure).

By including or configuring the communication manager 810 in accordance with examples as described herein, the device 805 may support techniques for a device communicating with device 805 to refine a receive beam for receiving the third message based on the received reference signal, the received preamble, or both. Additionally or alternatively, the device 805 may support techniques for a device communicating with device 805 to perform improved (e.g., more accurate) channel estimation for reception of the third message. Accordingly, the device 805 and a device with which the device 805 communicates may perform more efficient communications.

Figure 9:
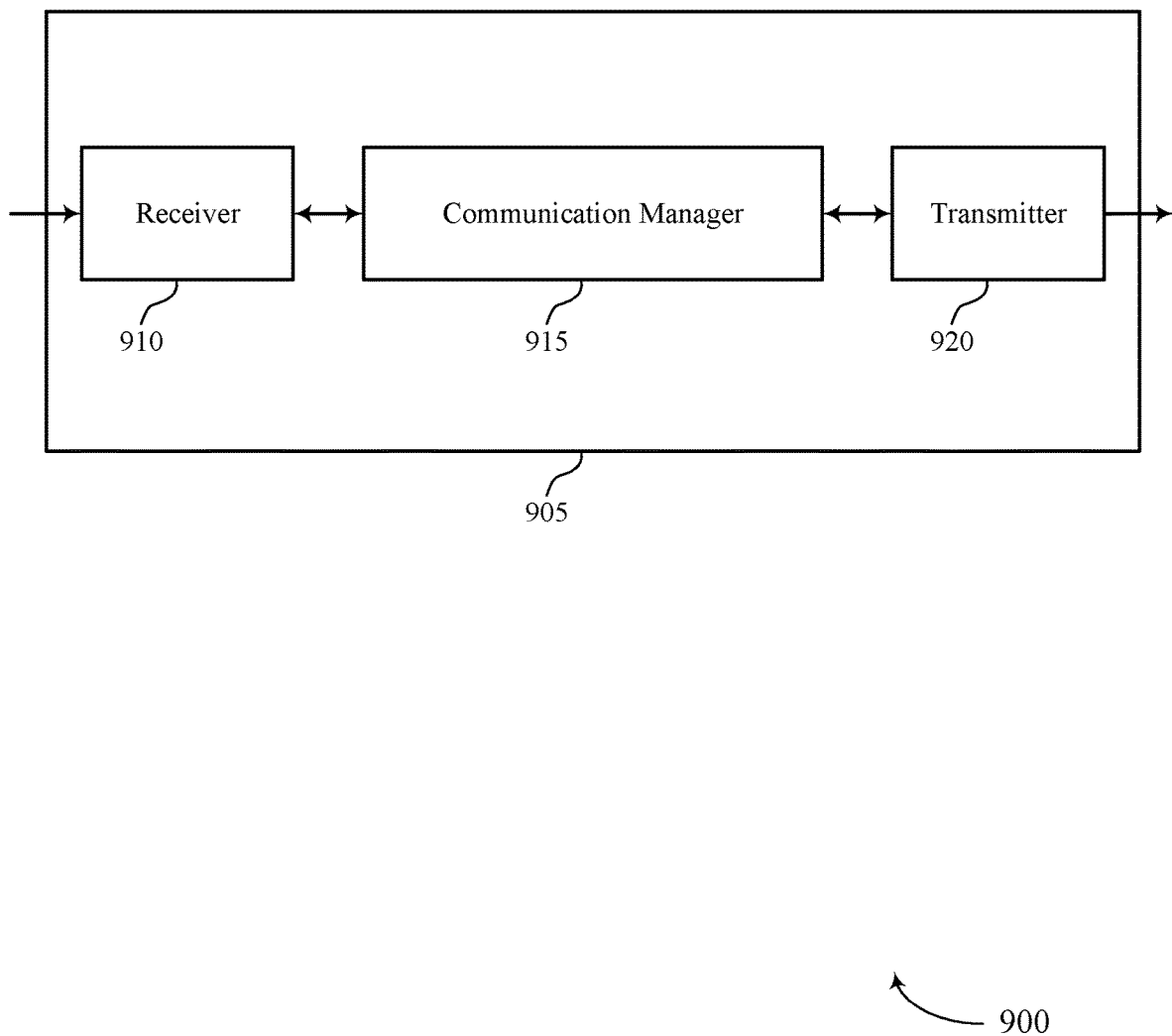
FIGS. 9 and 10 show block diagrams of devices that support front-loaded transmission in a random access channel procedure in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to front-loaded transmission in a random access channel procedure, etc.). Information may be passed on to other components of the device 905. The receiver 910 may be an example of aspects of the transceiver 1220 described with reference to FIG. 12. The receiver 910 may utilize a single antenna or a set of antennas.

The communication manager 915 may receive, from a UE, a first message of a RACH procedure, transmit a second message of the RACH procedure based on the first message, and receive a preamble, a reference signal, or both, and a third message of the RACH procedure based on the second message. The communication manager 915 may be an example of aspects of the communication manager 1210 described herein.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communication manager 915 in accordance with examples as described herein, the device 905 (e.g., a processor controlling or otherwise coupled to the receiver 910, the transmitter 920, the communication manager 915, or a combination thereof) may support techniques for the device 905 to refine a receive beam for receiving the third message based on the received reference signal, the received preamble, or both. Additionally or alternatively, the device 905 may support techniques for the device 905 to perform improved (e.g., more accurate) channel estimation for reception of the third message. Accordingly, the device 905 may perform more efficient communications (e.g., with another device from which the device 905 received the preamble, the reference signal, or both).

Figure 10:
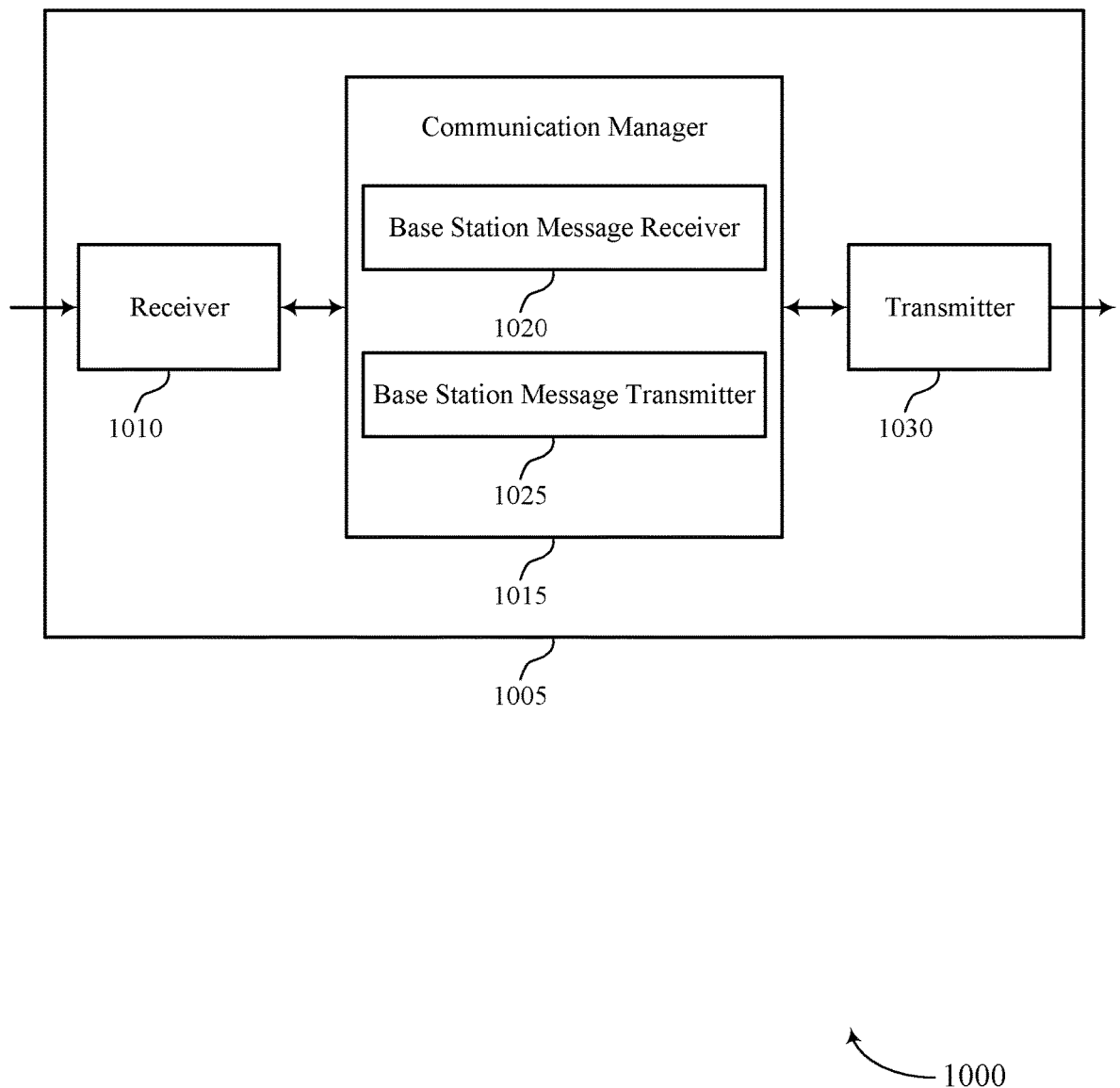

FIG. 10 shows a block diagram 1000 of a device 1005 in accordance with aspects of the present disclosure. The device 1005 may be an example of aspects of a device 905, or a base station 105 as described herein. The device 1005 may include a receiver 1010, a communication manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to front-loaded transmission in a random access channel procedure, etc.). Information may be passed on to other components of the device 1005. The receiver 1010 may be an example of aspects of the transceiver 1220 described with reference to FIG. 12. The receiver 1010 may utilize a single antenna or a set of antennas.

The communication manager 1015 may be an example of aspects of the communication manager 915 as described herein. The communication manager 1015 may include a base station message receiver 1020 and a base station message transmitter 1025. The communication manager 1015 may be an example of aspects of the communication manager 1210 described herein.

The base station message receiver 1020 may receive, from a UE, a first message of a RACH procedure. In some cases, the base station message receiver 1020 may receive a preamble, a reference signal, or both, and a third message of the RACH procedure based on a second message transmitted by base station message transmitter 1025. The base station message transmitter 1025 may transmit a second message of the RACH procedure based on the first message.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
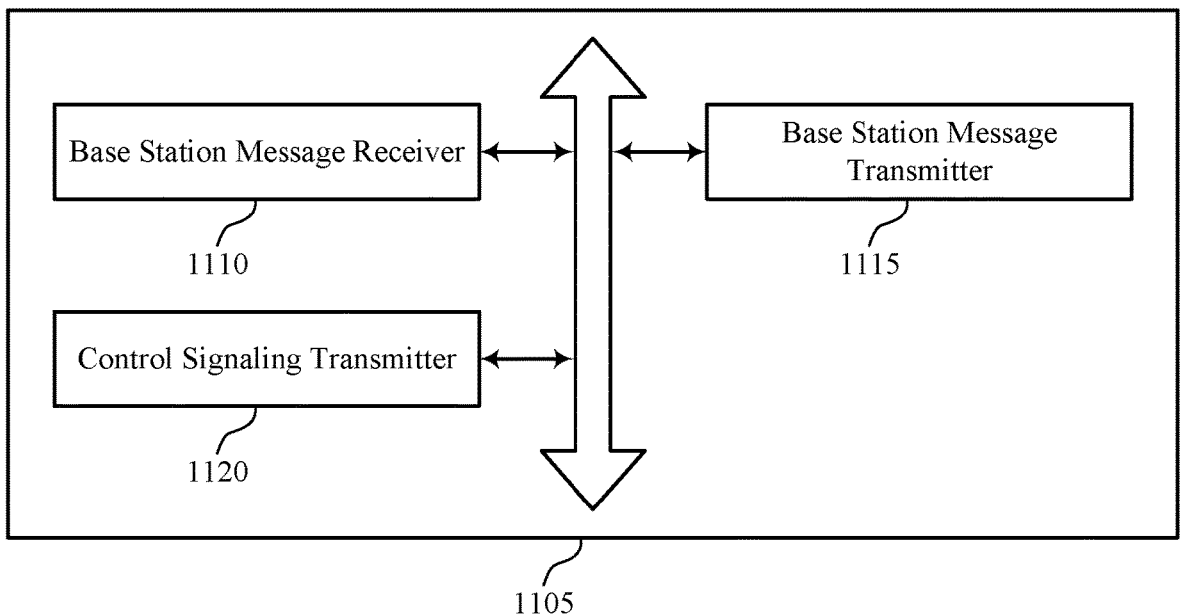
FIG. 11 shows a block diagram of a communication manager in accordance with aspects of the present disclosure.

FIG. 11 shows a block diagram 1100 of a communication manager 1105 in accordance with aspects of the present disclosure. The communication manager 1105 may be an example of aspects of a communication manager 915, a communication manager 1015, or a communication manager 1210 described herein. The communication manager 1105 may include a base station message receiver 1110, a base station message transmitter 1115, and a control signaling transmitter 1120. Each of these modules may communicate, directly or indirectly, with one another (e.g., via one or more buses).

The base station message receiver 1110 may receive, from a UE, a first message of a RACH procedure. In some examples, the base station message receiver 1110 may receive a preamble, a reference signal, or both, and a third message of the RACH procedure based on a second message transmitted by base station message transmitter 1115. In some examples, the base station message receiver 1110 may receive the preamble, the reference signal, or both, before the third message. In some examples, the base station message receiver 1110 may receive the preamble, the reference signal, or both, based on a reference signal received power measurement. In some examples, the base station message receiver 1110 may receive the preamble, the reference signal, or both, based on an exposure condition being identified. In some examples, the RACH procedure may be a four step RACH procedure.

The base station message transmitter 1115 may transmit a second message of the RACH procedure based on the first message. In some examples, the second message may indicate the first option to instruct the UE to transmit the preamble, the reference signal, or both, with the third message. In some examples, the second message may instruct the UE to transmit the preamble, the reference signal, or both, with the third message. In some examples, the base station message transmitter 1115 may transmit a fourth message of the RACH procedure based on the third message.

The control signaling transmitter 1120 may transmit control signaling configuring the UE to transmit the preamble, the reference signal, or both. In some examples, the control signaling transmitter 1120 may transmit control signaling configuring the UE with a first option for transmission of the preamble, the reference signal, or both, with the third message, and a second option for transmission of the third message without transmission of the preamble, the reference signal, or both. In some examples, the control signaling transmitter 1120 may transmit control signaling configuring the UE with a first resource in which to transmit the preamble, the reference signal, or both, and a second resource in which to transmit the third message. In some examples, the first resource and the second resource may be contiguous in time. In some examples, the time period may occur between the first resource and the second resource. In some examples, the first resource and the second resource may be contiguous in frequency. In some examples, the frequency gap may occur between the first resource and the second resource.

Figure 12:
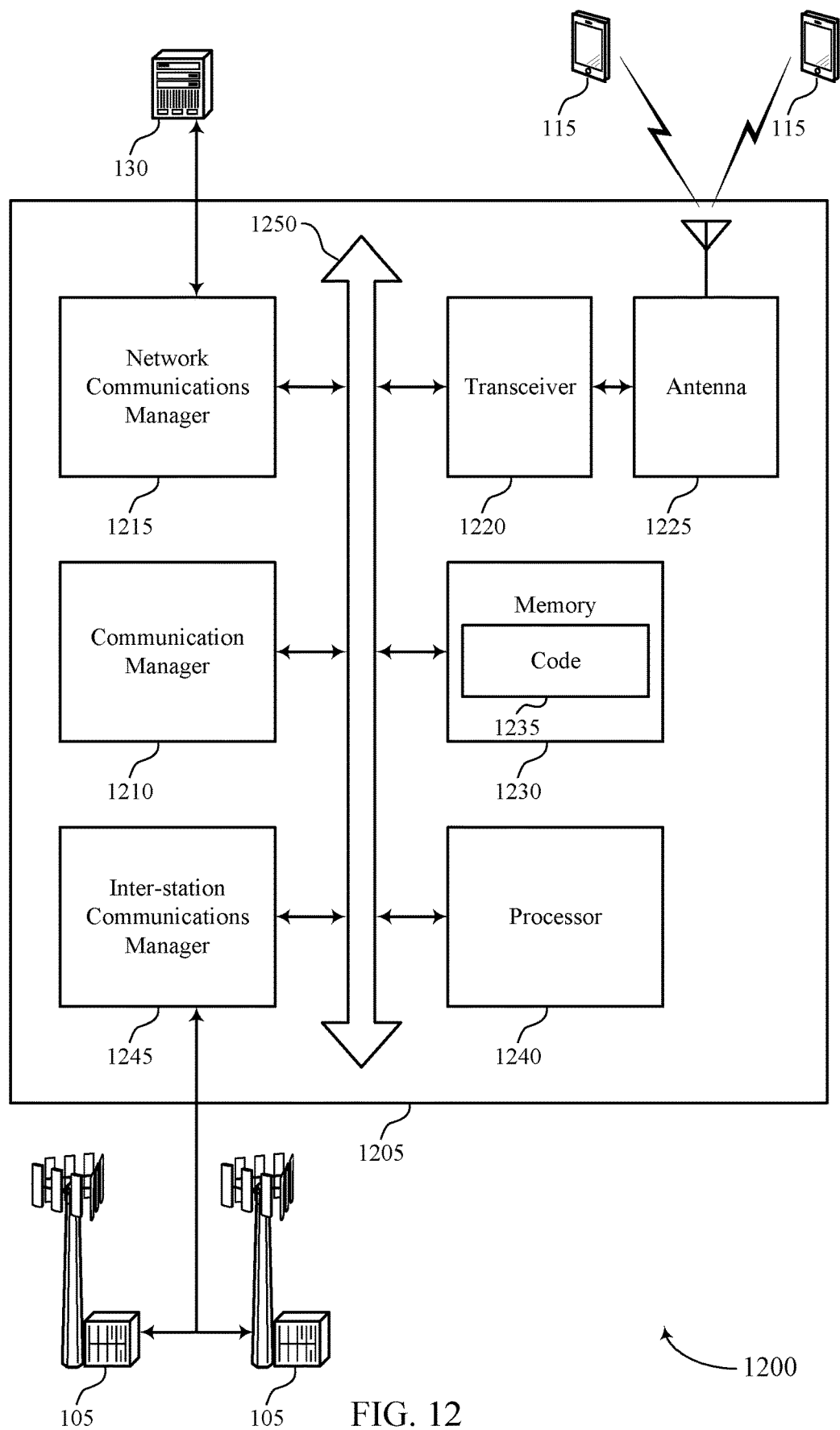
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may receive, from a UE, a first message of a RACH procedure, transmit a second message of the RACH procedure based on the first message, and receive a preamble, a reference signal, or both, and a third message of the RACH procedure based on the second message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting front-loaded transmission in a random access channel procedure).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

By including or configuring the communication manager 1210 in accordance with examples as described herein, the device 1205 may support techniques for the device 1205 to refine a receive beam for receiving the third message based on the received reference signal, the received preamble, or both. Additionally or alternatively, the device 1205 may support techniques for the device 1205 to perform improved (e.g., more accurate) channel estimation for reception of the third message. Accordingly, the device 1205 may perform more efficient communications (e.g., with another device from which the device 1205 received the preamble, the reference signal, or both).

Figure 13:
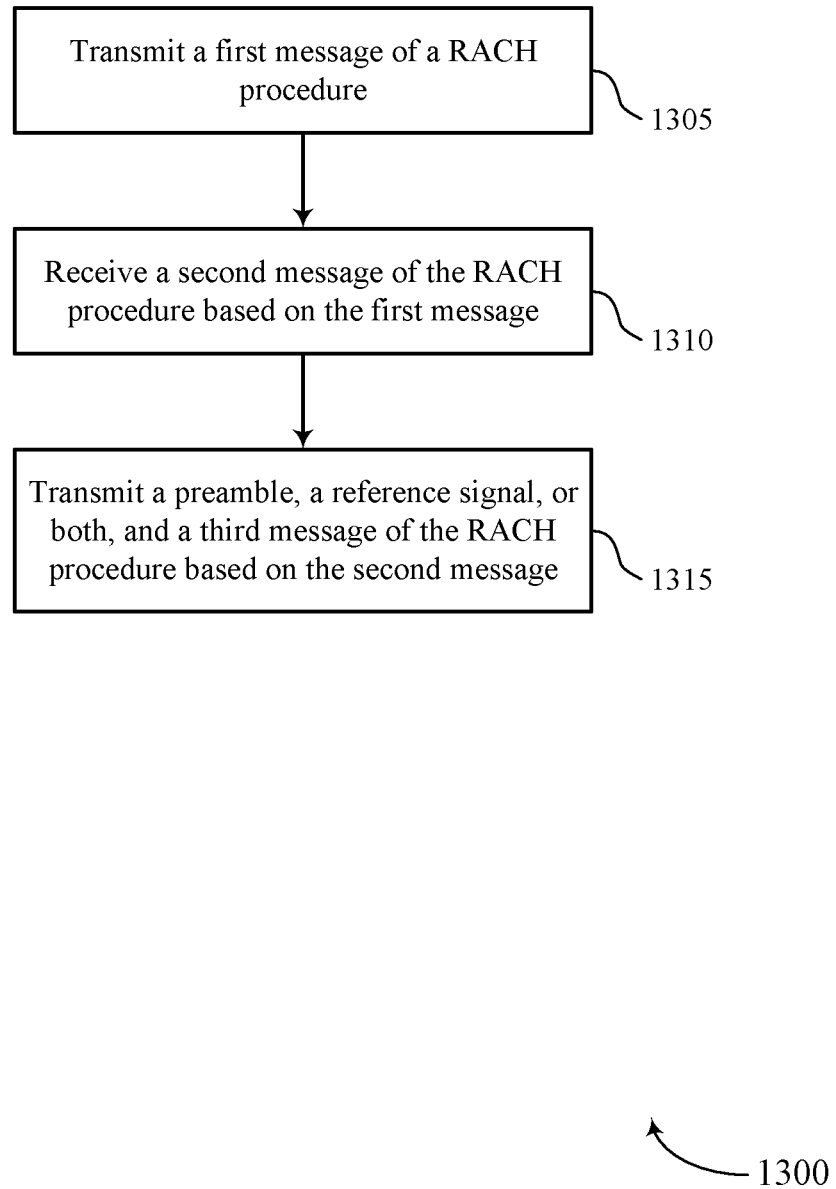
FIGS. 13 through 17 show flowcharts illustrating methods that support front-loaded transmission in a random access channel procedure in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may transmit a first message of a RACH procedure. The operations of 1305 may be performed according to the methods described herein. In some examples, aspects of the operations of 1305 may be performed by an UE message transmitter as described with reference to FIGS. 5 through 8.

At 1310, the UE may receive a second message of the RACH procedure based on the first message. The operations of 1310 may be performed according to the methods described herein. In some examples, aspects of the operations of 1310 may be performed by an UE message receiver as described with reference to FIGS. 5 through 8.

At 1315, the UE may transmit a preamble, a reference signal, or both, and a third message of the RACH procedure based on the second message. The operations of 1315 may be performed according to the methods described herein. In some examples, aspects of the operations of 1315 may be performed by an UE message transmitter as described with reference to FIGS. 5 through 8.

Figure 14:
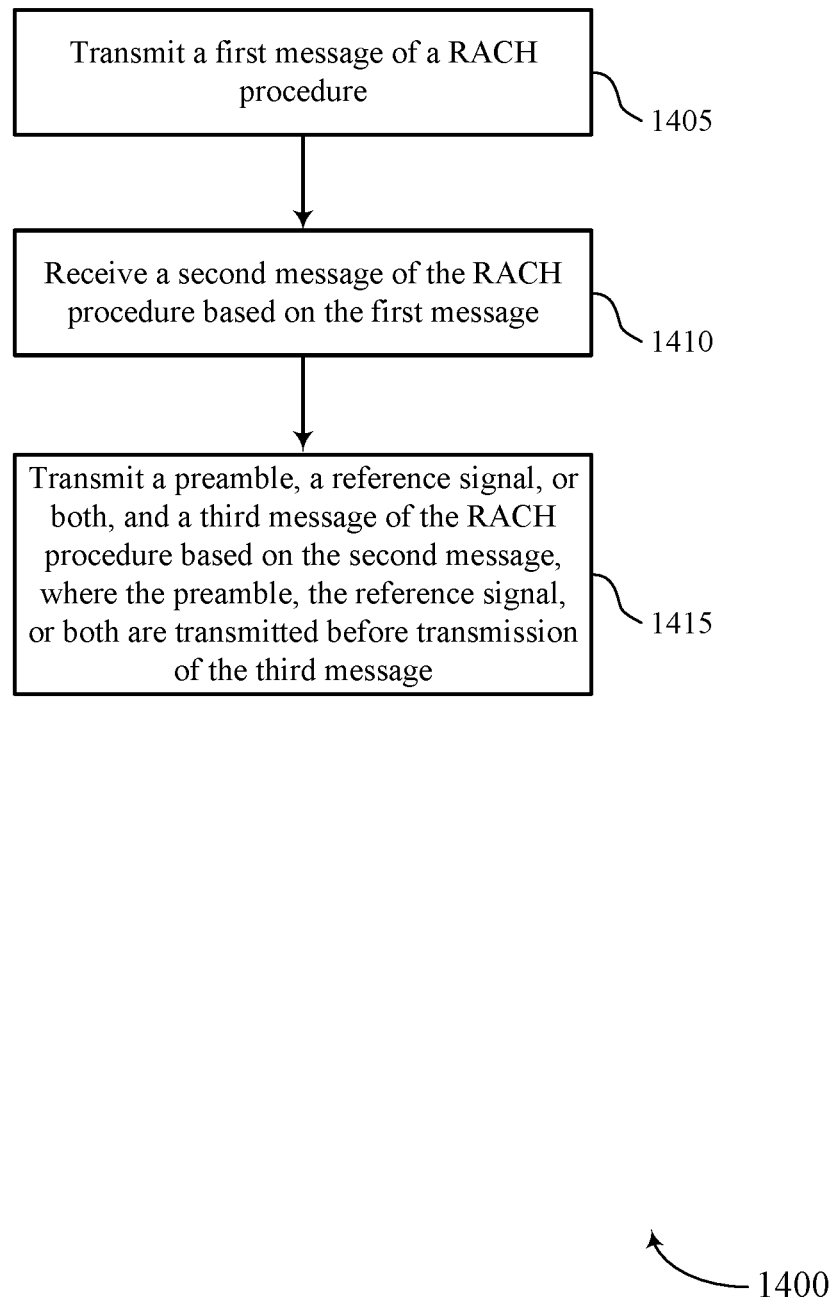

FIG. 14 shows a flowchart illustrating a method 1400 in accordance with aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1405, the UE may transmit a first message of a RACH procedure. The operations of 1405 may be performed according to the methods described herein. In some examples, aspects of the operations of 1405 may be performed by an UE message transmitter as described with reference to FIGS. 5 through 8.

At 1410, the UE may receive a second message of the RACH procedure based on the first message. The operations of 1410 may be performed according to the methods described herein. In some examples, aspects of the operations of 1410 may be performed by an UE message receiver as described with reference to FIGS. 5 through 8.

At 1415, the UE may transmit a preamble, a reference signal, or both, and a third message of the RACH procedure based on the second message, where the preamble, the reference signal, or both are transmitted before transmission of the third message. The operations of 1415 may be performed according to the methods described herein. In some examples, aspects of the operations of 1415 may be performed by an UE message transmitter as described with reference to FIGS. 5 through 8.

Figure 15:
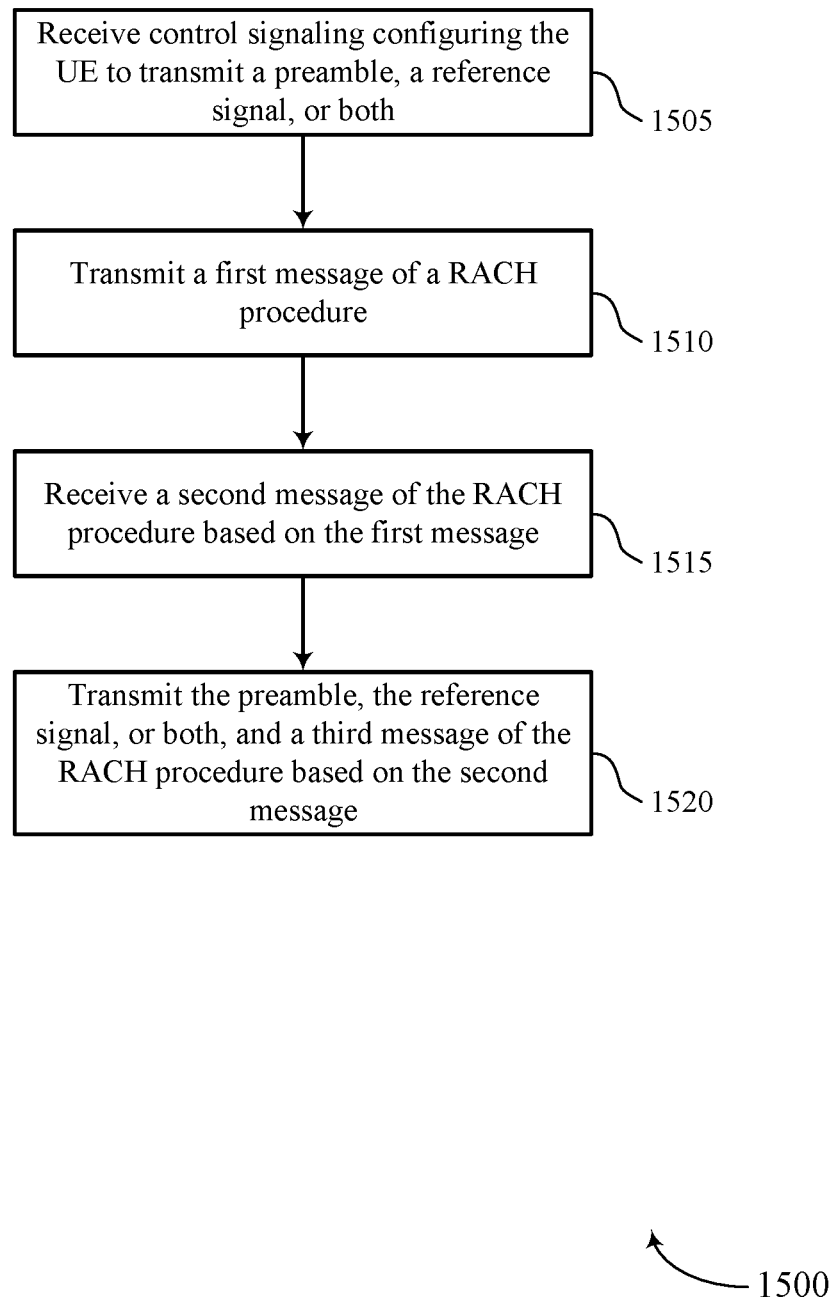

FIG. 15 shows a flowchart illustrating a method 1500 in accordance with aspects of the present disclosure. The operations of method 1500 may be implemented by a UE 115 or its components as described herein. For example, the operations of method 1500 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1505, the UE may receive control signaling configuring the UE to transmit a preamble, a reference signal, or both. The operations of 1505 may be performed according to the methods described herein. In some examples, aspects of the operations of 1505 may be performed by a control signaling receiver as described with reference to FIGS. 5 through 8.

At 1510, the UE may transmit a first message of a RACH procedure. The operations of 1510 may be performed according to the methods described herein. In some examples, aspects of the operations of 1510 may be performed by an UE message transmitter as described with reference to FIGS. 5 through 8.

At 1515, the UE may receive a second message of the RACH procedure based on the first message. The operations of 1515 may be performed according to the methods described herein. In some examples, aspects of the operations of 1515 may be performed by an UE message receiver as described with reference to FIGS. 5 through 8.

At 1520, the UE may transmit the preamble, the reference signal, or both, and a third message of the RACH procedure based on the second message. The operations of 1520 may be performed according to the methods described herein. In some examples, aspects of the operations of 1520 may be performed by an UE message transmitter as described with reference to FIGS. 5 through 8.

Figure 16:
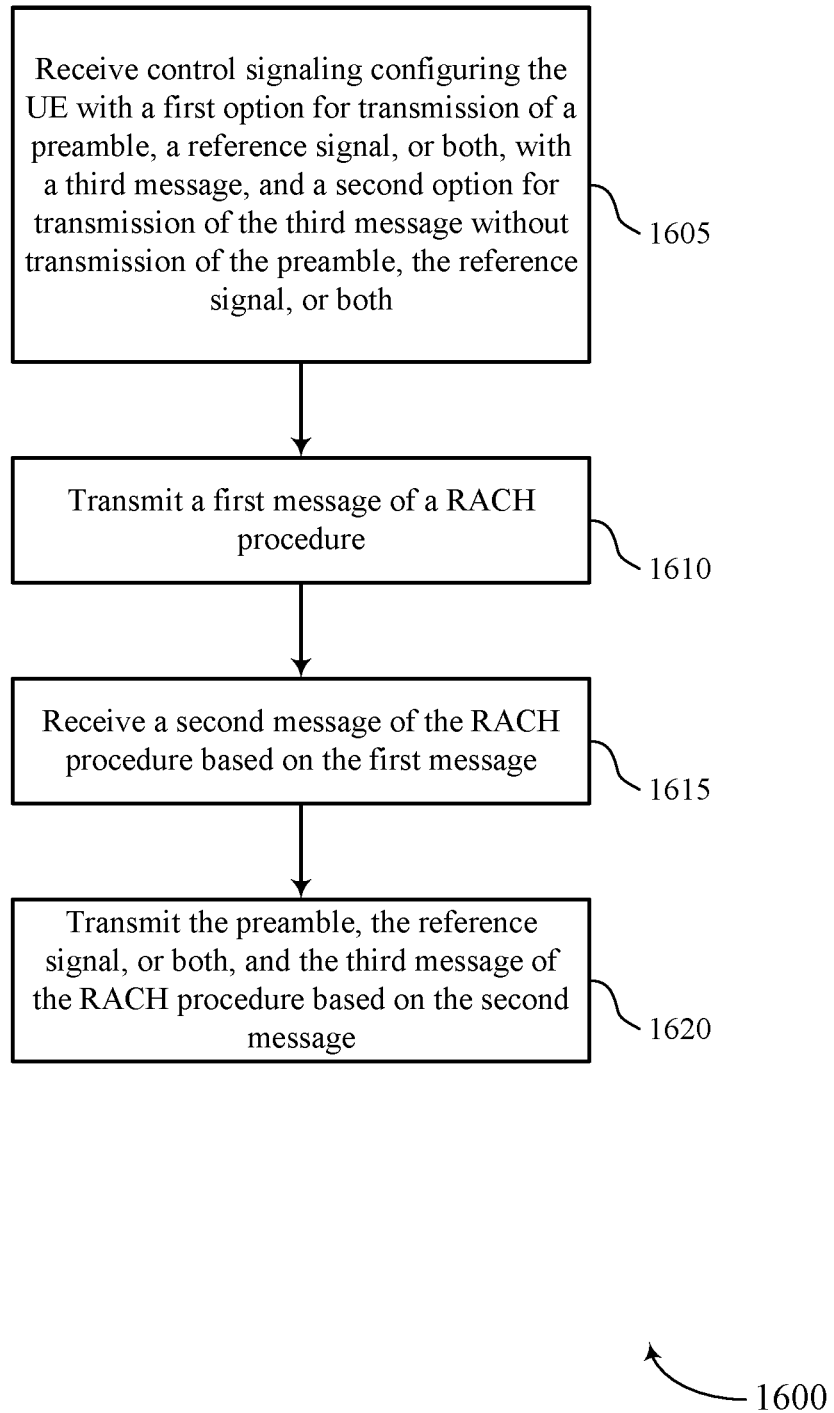

FIG. 16 shows a flowchart illustrating a method 1600 in accordance with aspects of the present disclosure. The operations of method 1600 may be implemented by a UE 115 or its components as described herein. For example, the operations of method 1600 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1605, the UE may receive control signaling configuring the UE with a first option for transmission of a preamble, a reference signal, or both, with a third message, and a second option for transmission of the third message without transmission of the preamble, the reference signal, or both. The operations of 1605 may be performed according to the methods described herein. In some examples, aspects of the operations of 1605 may be performed by a control signaling receiver as described with reference to FIGS. 5 through 8.

At 1610, the UE may transmit a first message of a RACH procedure. The operations of 1610 may be performed according to the methods described herein. In some examples, aspects of the operations of 1610 may be performed by an UE message transmitter as described with reference to FIGS. 5 through 8.

At 1615, the UE may receive a second message of the RACH procedure based on the first message. The operations of 1615 may be performed according to the methods described herein. In some examples, aspects of the operations of 1615 may be performed by an UE message receiver as described with reference to FIGS. 5 through 8.

At 1620, the UE may transmit the preamble, the reference signal, or both, and the third message of the RACH procedure based on the second message. The operations of 1620 may be performed according to the methods described herein. In some examples, aspects of the operations of 1620 may be performed by an UE message transmitter as described with reference to FIGS. 5 through 8.

Figure 17:
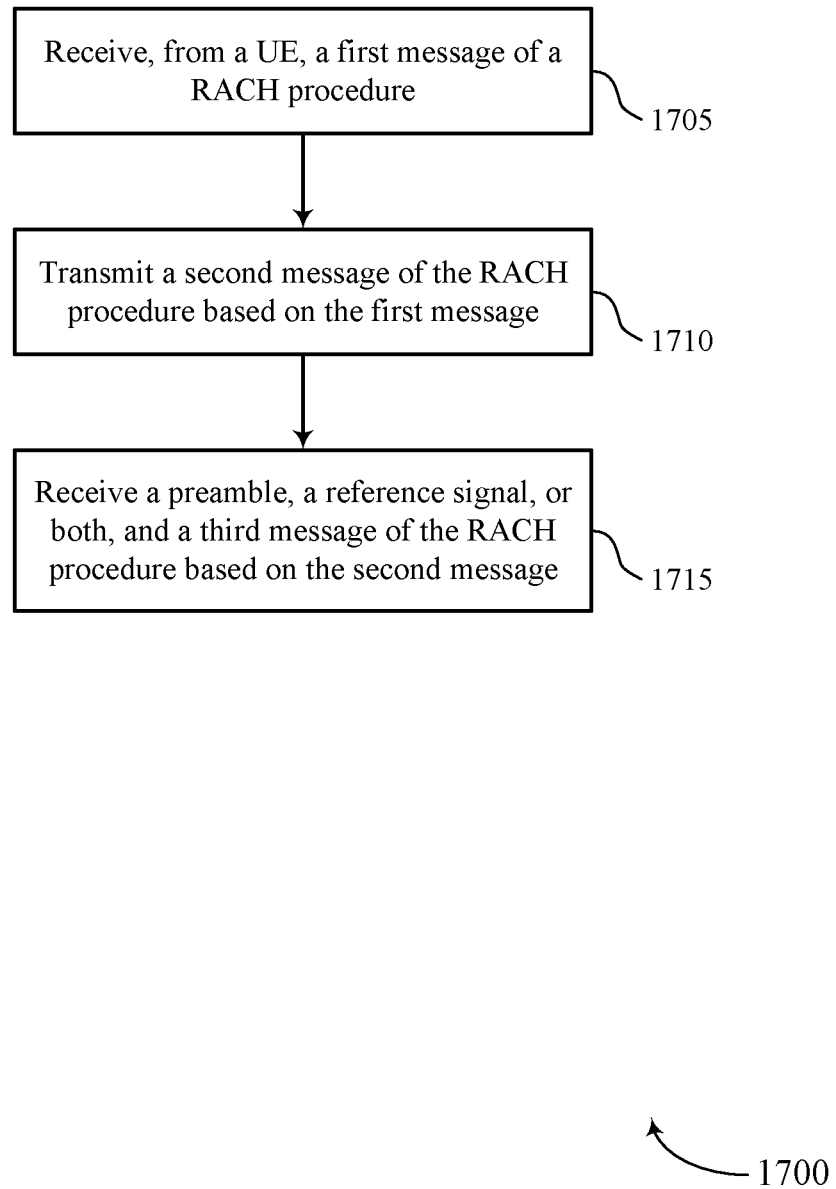

FIG. 17 shows a flowchart illustrating a method 1700 in accordance with aspects of the present disclosure. The operations of method 1700 may be implemented by a base station 105 or its components as described herein. For example, the operations of method 1700 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1705, the base station may receive, from a UE, a first message of a RACH procedure. The operations of 1705 may be performed according to the methods described herein. In some examples, aspects of the operations of 1705 may be performed by a base station message receiver as described with reference to FIGS. 9 through 12.

At 1710, the base station may transmit a second message of the RACH procedure based on the first message. The operations of 1710 may be performed according to the methods described herein. In some examples, aspects of the operations of 1710 may be performed by a base station message transmitter as described with reference to FIGS. 9 through 12.

At 1715, the base station may receive a preamble, a reference signal, or both, and a third message of the RACH procedure based on the second message. The operations of 1715 may be performed according to the methods described herein. In some examples, aspects of the operations of 1715 may be performed by a base station message receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications by a UE, comprising: transmitting a first message of a RACH procedure: receiving a second message of the RACH procedure based at least in part on the first message: and transmitting a preamble, a reference signal, or both, and a third message of the RACH procedure based at least in part on the second message.

Aspect 2: The method of aspect 1, wherein transmitting the preamble, the reference signal, or both, comprises: transmitting the preamble, the reference signal, or both, before transmission of the third message.

Aspect 3: The method of any of aspects 1 through 2, wherein transmitting the preamble, the reference signal, or both, comprises: transmitting the preamble, the reference signal, or both, based at least in part on a reference signal received power measurement.

Aspect 4: The method of any of aspects 1 through 3, further comprising: receiving control signaling configuring the UE to transmit the preamble, the reference signal, or both.

Aspect 5: The method of any of aspects 1 through 4, further comprising: receiving control signaling configuring the UE with a first option for transmission of the preamble, the reference signal, or both, with the third message, and a second option for transmission of the third message without transmission of the preamble, the reference signal, or both.

Aspect 6: The method of aspect 5, wherein receiving the second message comprises: receiving the second message that indicates the first option to instruct the UE to transmit the preamble, the reference signal, or both, with the third message.

Aspect 7: The method of any of aspects 1 through 6, wherein receiving the second message comprises: receiving the second message that instructs the UE to transmit the preamble, the reference signal, or both, with the third message.

Aspect 8: The method of any of aspects 1 through 7, further comprising: receiving control signaling configuring the UE with a first resource in which to transmit the preamble, the reference signal, or both, and a second resource in which to transmit the third message.

Aspect 9: The method of aspect 8, wherein the first resource and the second resource are contiguous in time.

Aspect 10: The method of any of aspects 8 through 9, wherein a time period occurs between the first resource and the second resource.

Aspect 11: The method of any of aspects 8 through 10, wherein the first resource and the second resource are contiguous in frequency.

Aspect 12: The method of any of aspects 8 through 11, wherein a frequency gap occurs between the first resource and the second resource.

Aspect 13: The method of any of aspects 1 through 12, wherein transmitting the preamble, the reference signal, or both, comprises: transmitting the preamble, the reference signal, or both, based at least in part on an exposure condition being identified.

Aspect 14: The method of any of aspects 1 through 13, further comprising: receiving a fourth message of the RACH procedure based at least in part on the third message.

Aspect 15: The method of any of aspects 1 through 14, wherein the RACH procedure is a four-step RACH procedure.

Aspect 16: A method for wireless communications by a base station, comprising: receiving, from a UE, a first message of a RACH procedure: transmitting a second message of the RACH procedure based at least in part on the first message: and receiving a preamble, a reference signal, or both, and a third message of the RACH procedure based at least in part on the second message.

Aspect 17: The method of aspect 16, wherein receiving the preamble, the reference signal, or both, comprises: receiving the preamble, the reference signal, or both, before the third message.

Aspect 18: The method of any of aspects 16 through 17, wherein receiving the preamble, the reference signal, or both, comprises: receiving the preamble, the reference signal, or both, based at least in part on a reference signal received power measurement.

Aspect 19: The method of any of aspects 16 through 18, further comprising: transmitting control signaling configuring the UE to transmit the preamble, the reference signal, or both.

Aspect 20: The method of any of aspects 16 through 19, further comprising: transmitting control signaling configuring the UE with a first option for transmission of the preamble, the reference signal, or both, with the third message, and a second option for transmission of the third message without transmission of the preamble, the reference signal, or both.

Aspect 21: The method of aspect 20, wherein transmitting the second message comprises: transmitting the second message that indicates the first option to instruct the UE to transmit the preamble, the reference signal, or both, with the third message.

Aspect 22: The method of any of aspects 16 through 21, wherein transmitting the second message comprises: transmitting the second message that instructs the UE to transmit the preamble, the reference signal, or both, with the third message.

Aspect 23: The method of any of aspects 16 through 22, further comprising: transmitting control signaling configuring the UE with a first resource in which to transmit the preamble, the reference signal, or both, and a second resource in which to transmit the third message.

Aspect 24: The method of aspect 23, wherein the first resource and the second resource are contiguous in time.

Aspect 25: The method of any of aspects 23 through 24, wherein a time period occurs between the first resource and the second resource.

Aspect 26: The method of any of aspects 23 through 25, wherein the first resource and the second resource are contiguous in frequency.

Aspect 27: The method of any of aspects 23 through 26, wherein a frequency gap occurs between the first resource and the second resource.

Aspect 28: The method of any of aspects 16 through 27, wherein receiving the preamble, the reference signal, or both, comprises: receiving the preamble, the reference signal, or both, based at least in part on an exposure condition being identified.

Aspect 29: The method of any of aspects 16 through 28, further comprising: transmitting a fourth message of the RACH procedure based at least in part on the third message.

Aspect 30: The method of any of aspects 16 through 29, wherein the RACH procedure is a four-step RACH procedure.

Aspect 31: An apparatus for wireless communications by a UE, comprising a processor; memory coupled with the processor: and instructions stored in the memory and executable by the processor to cause the apparatus to perform a method of any of aspects 1 through 15.

Aspect 32: An apparatus for wireless communications by a UE, comprising at least one means for performing a method of any of aspects 1 through 15.

Aspect 33: A non-transitory computer-readable medium storing code for wireless communications by a UE, the code comprising instructions executable by a processor to perform a method of any of aspects 1 through 15.

Aspect 34: An apparatus for wireless communications by a base station, comprising a processor; memory coupled with the processor; and instructions stored in the memory and executable by the processor to cause the apparatus to perform a method of any of aspects 16 through 30.

Aspect 35: An apparatus for wireless communications by a base station, comprising at least one means for performing a method of any of aspects 16 through 30.

Aspect 36: A non-transitory computer-readable medium storing code for wireless communications by a base station, the code comprising instructions executable by a processor to perform a method of any of aspects 16 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    transmitting a first message of a random access channel (RACH) procedure;
    receiving a second message of the RACH procedure based at least in part on the first message; and
    transmitting, based at least in part on the second message and a reference signal measurement being below a threshold value, a beam refinement preamble for a third message of the RACH procedure before transmission of the third message by the UE, wherein the beam refinement preamble is associated with receive beam refinement for a reception of the third message by a network device.

2. The method of claim 1, wherein transmitting the beam refinement preamble comprises:
    transmitting the beam refinement preamble after receiving the second message.

3. The method of claim 1, wherein the reference signal measurement comprises a reference signal received power measurement.

4. The method of claim 1, further comprising:
    receiving control signaling configuring the UE to transmit the beam refinement preamble.

5. The method of claim 1, further comprising:
    receiving control signaling configuring the UE with: a first option for transmission of the beam refinement preamble with the third message; and a second option for transmission of the third message without transmission of the beam refinement preamble.

6. The method of claim 5, wherein receiving the second message comprises:
    receiving the second message that indicates the first option to instruct the UE to transmit the beam refinement preamble with the third message.

7. The method of claim 1, wherein receiving the second message comprises:
    receiving the second message that instructs the UE to transmit the beam refinement preamble with the third message.

8. The method of claim 1, further comprising:
    receiving control signaling configuring the UE with a first resource in which to transmit the beam refinement preamble and a second resource in which to transmit the third message.

9. The method of claim 8, wherein the first resource and the second resource are contiguous in time.

10. The method of claim 8, wherein a time period occurs between the first resource and the second resource.

11. The method of claim 8, wherein the first resource and the second resource are contiguous in frequency.

12. The method of claim 8, wherein a frequency gap occurs between the first resource and the second resource.

13. The method of claim 1, wherein transmitting the beam refinement preamble comprises:
    transmitting the beam refinement preamble based at least in part on an exposure condition being identified.

14. A method for wireless communications by a network device, comprising:
    receiving, from a user equipment (UE), a first message of a random access channel (RACH) procedure;
    transmitting a second message of the RACH procedure based at least in part on the first message;
    receiving, based at least in part on the second message and a reference signal measurement being below a threshold value, a beam refinement preamble for a third message of the RACH procedure before receiving the third message, wherein the beam refinement preamble is associated with receive beam refinement for a reception of the third message by the network device; and
    performing the receive beam refinement based at least in part on the beam refinement preamble.

15. The method of claim 14, wherein receiving the beam refinement preamble comprises:
    receiving the beam refinement preamble after transmitting the second message.

16. The method of claim 14, wherein the reference signal measurement comprises a reference signal received power measurement.

17. The method of claim 14, further comprising:
    transmitting control signaling configuring the UE to transmit the beam refinement preamble.

18. The method of claim 14, further comprising:
    transmitting control signaling configuring the UE with: a first option for transmission of the beam refinement preamble with the third message; and a second option for transmission of the third message without transmission of the beam refinement preamble.

19. The method of claim 18, wherein transmitting the second message comprises:
    transmitting the second message that indicates the first option to instruct the UE to transmit the beam refinement preamble with the third message.

20. The method of claim 14, wherein transmitting the second message comprises:
    transmitting the second message that instructs the UE to transmit the beam refinement preamble with the third message.

21. The method of claim 14, further comprising:
    transmitting control signaling configuring the UE with a first resource in which to transmit the beam refinement preamble and a second resource in which to transmit the third message.

22. The method of claim 21, wherein the first resource and the second resource are contiguous in time.

23. The method of claim 21, wherein a time period occurs between the first resource and the second resource.

24. The method of claim 21, wherein the first resource and the second resource are contiguous in frequency.

25. The method of claim 21, wherein a frequency gap occurs between the first resource and the second resource.

26. The method of claim 14, wherein receiving the beam refinement preamble comprises:
    receiving the beam refinement preamble based at least in part on an exposure condition being identified.

27. An apparatus for wireless communications by a user equipment (UE), comprising:
    one or more memories; and
    one or more processors coupled with the one or more memories, the one or more processors individually or collectively configured to cause the UE to:
        transmit a first message of a random access channel (RACH) procedure;

receive a second message of the RACH procedure based at least in part on the first message; and transmit, based at least in part on the second message and a reference signal measurement being below a threshold value, a beam refinement preamble for a third message of the RACH procedure before transmission of the third message by the UE, wherein the beam refinement preamble is associated with receive beam refinement for a reception of the third message by a network device.

28. The apparatus of claim 27, further comprising at least one of:

a transceiver configured to transmit the first message, the beam refinement preamble, the third message, or any combination thereof;

the transceiver configured to receive the second message; or both.

29. An apparatus for wireless communications by a network device, comprising:

one or more memories; and one or more processors coupled with the one or more memories, the one or more processors individually or collectively configured to cause the network device to:

receive, from a user equipment (UE), a first message of a random access channel (RACH) procedure;

transmit a second message of the RACH procedure based at least in part on the first message;

receive, based at least in part on the second message and a reference signal measurement being below a threshold value, a beam refinement preamble for a third message of the RACH procedure before receiving the third message, wherein the beam refinement preamble is associated with receive beam refinement for a reception of the third message by the network device; and performing the receive beam refinement based at least in part on the beam refinement preamble.

30. The apparatus of claim 29, further comprising at least one of:

a transceiver configured to receive the first message, the beam refinement preamble, the third message, or any combination thereof;

the transceiver configured to transmit the second message; or both.

* * * * *